US012681967B2

(12) United States Patent
Shetty et al.

(10) Patent No.: US 12,681,967 B2
(45) Date of Patent: Jul. 14, 2026

(54) SYSTEM AND METHOD FOR OPTIMIZING QUERY RESOLUTION ON DIGITAL CHANNELS IN A CONTACT CENTER

(71) Applicant: NICE LTD., Ra'anana (IL)

(72) Inventors: Sanketh Shetty, Pune (IN); Salil Dhawan, Pune (IN); Pramod Giri, Pune (IN)

(73) Assignee: NICE LTD., Ra'anana (IL)

( * ) Notice: Subject to any disclaimer, the term of this patent is extended or adjusted under 35 U.S.C. 154(b) by 160 days.

(21) Appl. No.: 18/629,951

(22) Filed: Apr. 9, 2024

(65) Prior Publication Data

US 2025/0315457 A1 Oct. 9, 2025

(51) Int. Cl.
*G06F 16/3329* (2025.01)
*G06F 40/284* (2020.01)
*G06Q 30/015* (2023.01)

(52) U.S. Cl.
CPC ........ *G06F 16/3329* (2019.01); *G06F 40/284* (2020.01); *G06Q 30/015* (2023.01)

(58) Field of Classification Search
CPC ............. G06F 16/3329; G06F 16/9532; G06F 40/284; G06F 40/56; G06Q 30/015; G06Q 30/0277; G06Q 30/0201; G10L 13/10; H04L 51/226
See application file for complete search history.

(56) References Cited

U.S. PATENT DOCUMENTS

| | | | | |
|---|---|---|---|---|
| 9,141,997 | B2 * | 9/2015 | Gaedcke ............. | G06Q 30/0201 |
| 11,341,506 | B2 * | 5/2022 | Mora ................. | G06Q 30/0277 |
| 11,373,632 | B2 * | 6/2022 | Galitsky ................. | G10L 13/10 |
| 11,748,414 | B2 * | 9/2023 | Mohanty ........... | G06F 16/90332 |
| | | | | 707/739 |
| 2011/0288897 | A1 * | 11/2011 | Erhart .................... | G06Q 10/06 |
| | | | | 709/204 |
| 2015/0178371 | A1 * | 6/2015 | Seth ...................... | G06F 40/117 |
| | | | | 707/755 |
| 2017/0302613 | A1 * | 10/2017 | Imbrie ................. | H04L 51/226 |
| 2018/0041458 | A1 * | 2/2018 | Hawkins ............... | G06Q 10/40 |
| 2019/0163830 | A1 * | 5/2019 | DeLuca ............. | G06F 16/9532 |

(Continued)

*Primary Examiner* — Paras D Shah
*Assistant Examiner* — Nadira Sultana
(74) *Attorney, Agent, or Firm* — SOROKER AGMON NORDMAN RIBA; Liat Lin

(57) ABSTRACT

A computerized-method for resolving a query posted on an online-discussion-board of a social-media-platform and awaiting in a queue of a digital-communication-channel. The computerized-method includes: (i) monitoring the digital-communication-channel queue to select the query; (ii) operating an interaction-filtering module against the query to tag responses that were posted in a communication thread of the query in the online-discussion-board of the social-media, as valid; (iii) calculating a resolution-confidence score for each response of the responses that were tagged as valid, by operating a responder-recommended module; (iv) selecting a response from the responses that were tagged as valid that is above a preconfigured threshold and having a highest calculated resolution-confidence score; (v) automatically sending the selected response to the customer as a tryout-solution to the query; and (vi) upon receiving an indication from the customer that the query is resolved, removing the query from the queue of the digital-communication-channel.

7 Claims, 18 Drawing Sheets

(56)                    References Cited

U.S. PATENT DOCUMENTS

| | | | |
|---|---|---|---|
| 2022/0391595 A1* | 12/2022 | Shevelev | G06F 40/56 |
| 2023/0237543 A1* | 7/2023 | Casalino | G06Q 30/0282 |
| | | | 705/347 |
| 2023/0409841 A1* | 12/2023 | Mercer, III | G06Q 30/0281 |
| 2024/0394640 A1* | 11/2024 | Keret | G06Q 30/016 |
| 2025/0104702 A1* | 3/2025 | Reyes | G10L 15/1822 |

* cited by examiner

Figure 2A:
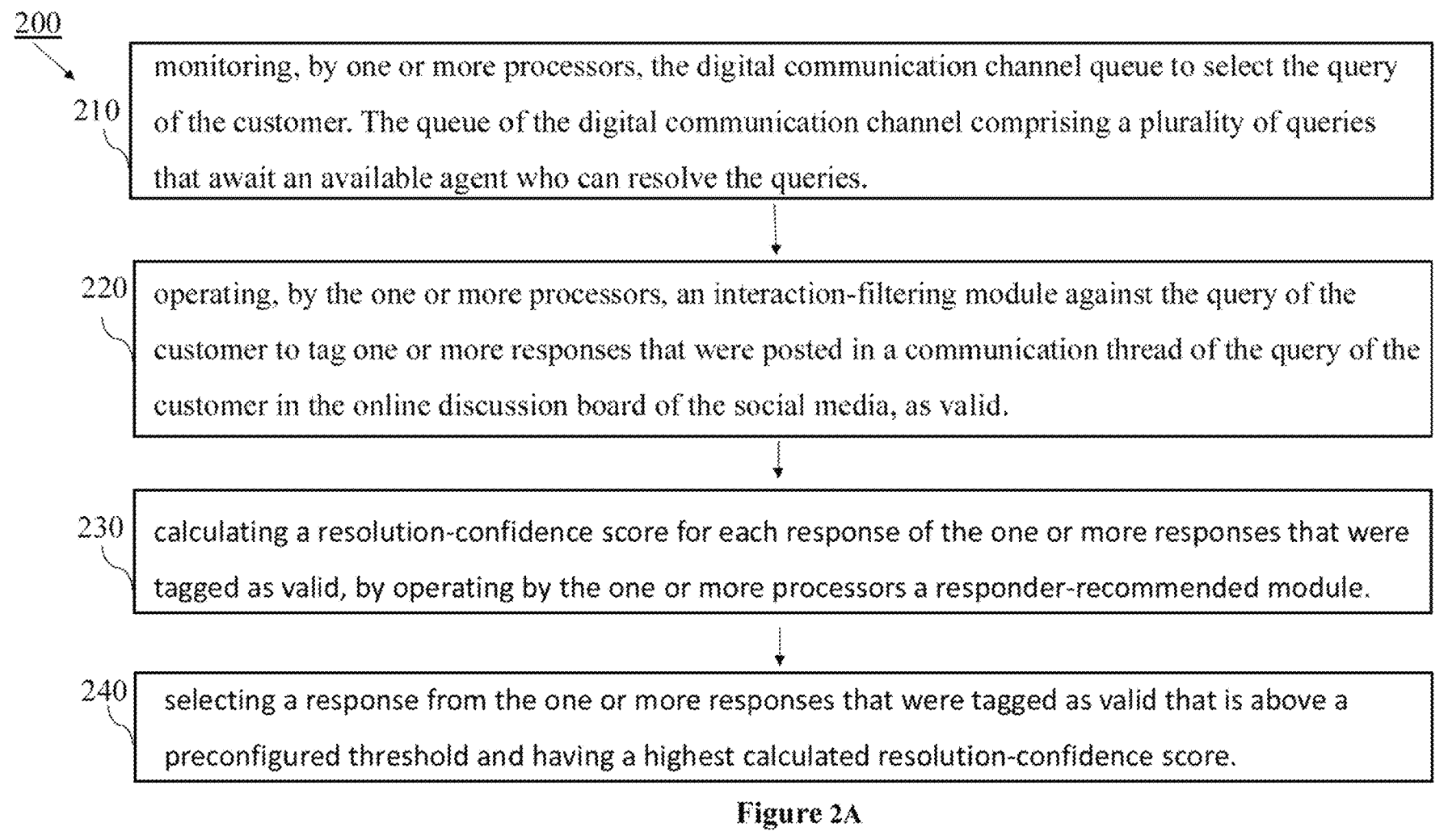

210 — monitoring, by one or more processors, the digital communication channel queue to select the query of the customer. The queue of the digital communication channel comprising a plurality of queries that await an available agent who can resolve the queries.

220 — operating, by the one or more processors, an interaction-filtering module against the query of the customer to tag one or more responses that were posted in a communication thread of the query of the customer in the online discussion board of the social media, as valid.

230 — calculating a resolution-confidence score for each response of the one or more responses that were tagged as valid, by operating by the one or more processors a responder-recommended module.

240 — selecting a response from the one or more responses that were tagged as valid that is above a preconfigured threshold and having a highest calculated resolution-confidence score.

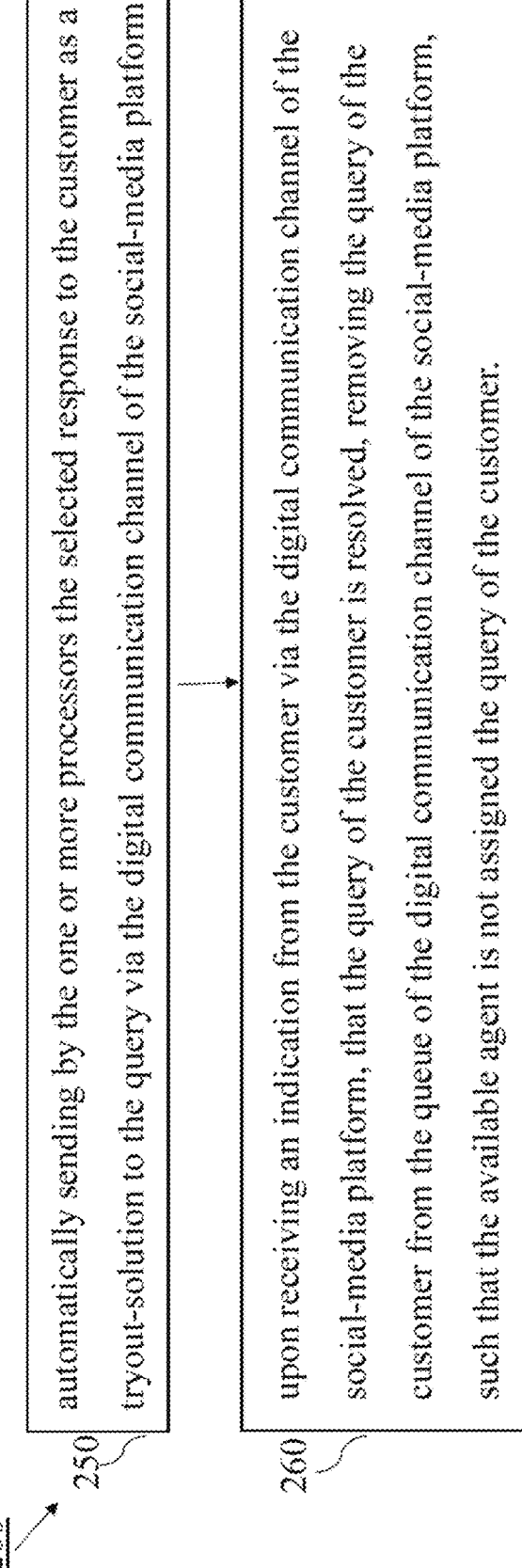

automatically sending by the one or more processors the selected response to the customer as a tryout-solution to the query via the digital communication channel of the social-media platform.

250 upon receiving an indication from the customer via the digital communication channel of the social-media platform, that the query of the customer is resolved, removing the query of the customer from the queue of the digital communication channel of the social-media platform, such that the available agent is not assigned the query of the customer.

260

200

Figure 2B $$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2}\sqrt{\sum_{i=1}^{n} B_i^2}}$$

Figure 4:
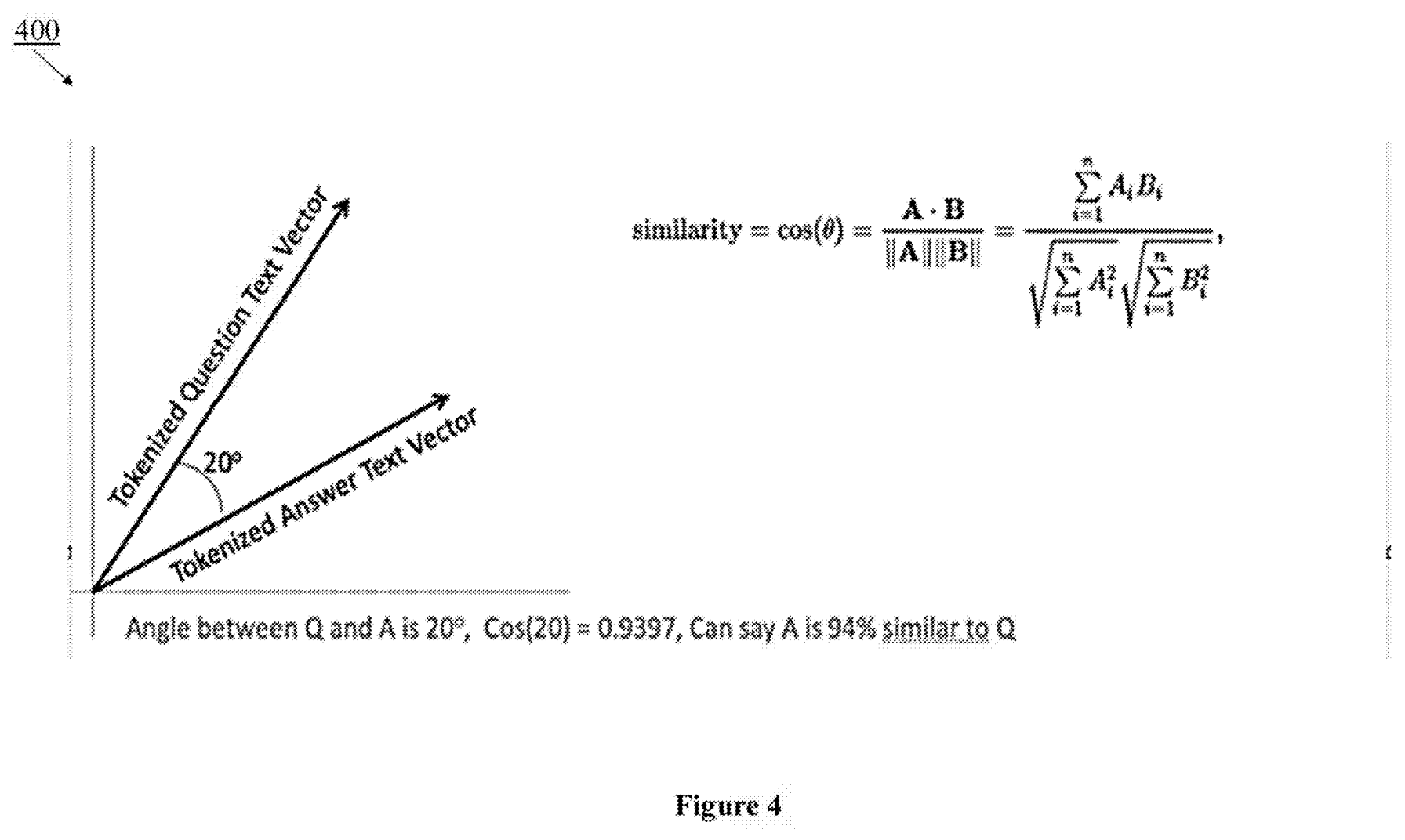

Tokenized Question Text Vector

Tokenized Answer Text Vector

20°

Angle between Q and A is 20°. Cos(20) = 0.9397, Can say A is 94% similar to Q

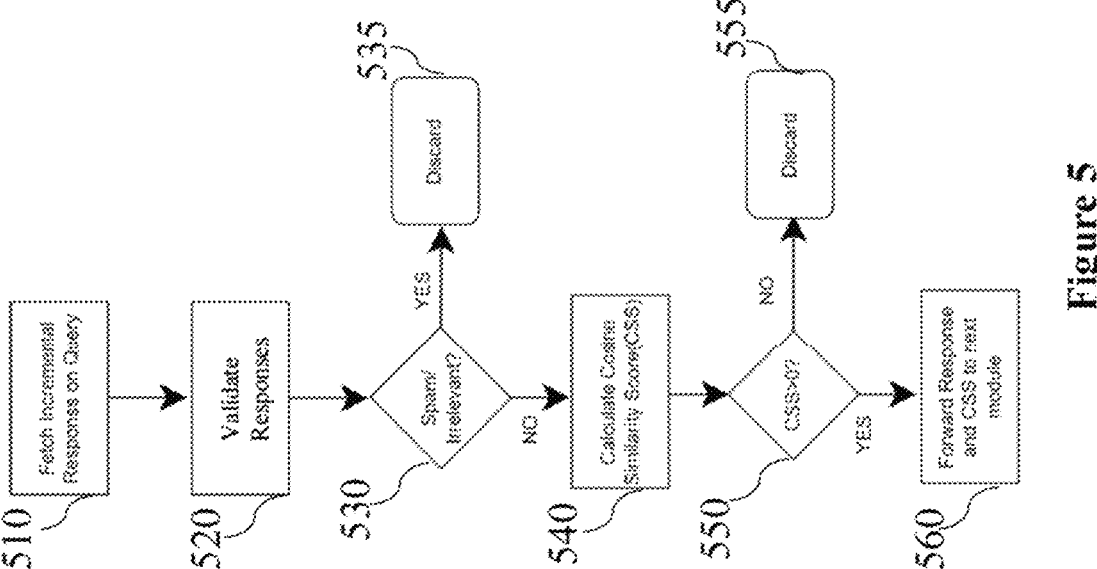
510 Fetch Incremental Responses on Query
520 Validate Responses
530 Spam/ Irrelevant?
535 Discard
540 Calculate Cosine Similarity Score(CSS)
550 CSS>θ?
555 Discard
560 Forward Response and CSS to next module
500
Figure 5

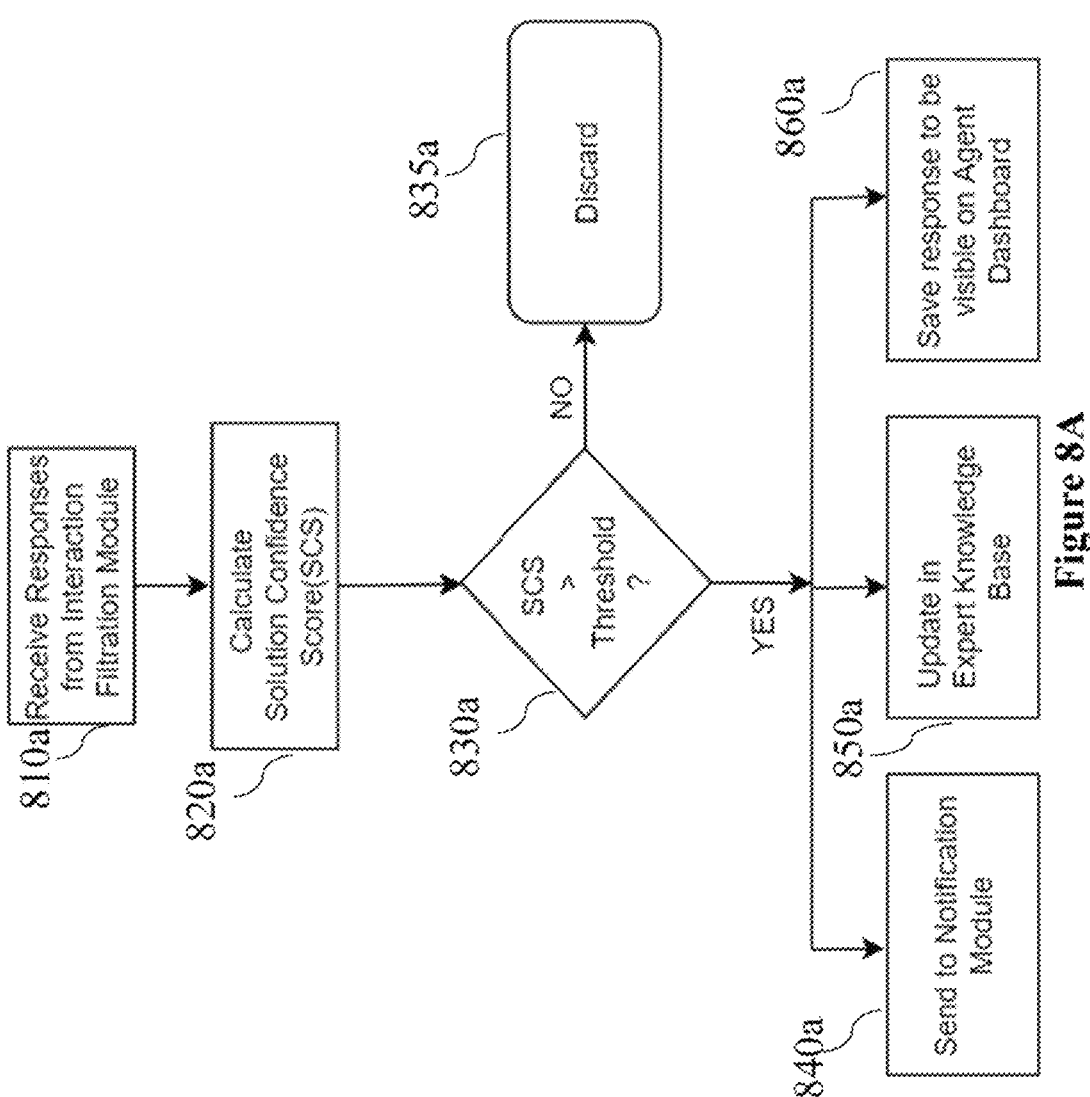
810a Receive Responses from Interaction Filtration Module
820a Calculate Solution Confidence Score(SCS)
830a SCS > Threshold ?
835a Discard
NO
YES
840a Send to Notification Module
850a Update in Expert Knowledge Base
860a Save response to be visible on Agent Dashboard
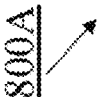
800A
Figure 8A

800B

| Response | Polarity | Subjectivity | Sentiment Score |
|---|---|---|---|
| Try to restart and it will work | 4 | 3 | 7 |
| I also faced same | 0 | 2 | 2 |
| Very bad product | -1 | 1 | 0 |
| Company is worst | -2 | 1 | -1 |

800C

| User Response | Intent Score |
|---|---|
| Please press the reboot button on back side | 1 |
| I also faced same problem | 0 |
| This is worst product | -1 |
| Click on the link in 2nd tab and this will solve it | 0.967 |

Figure 10B:
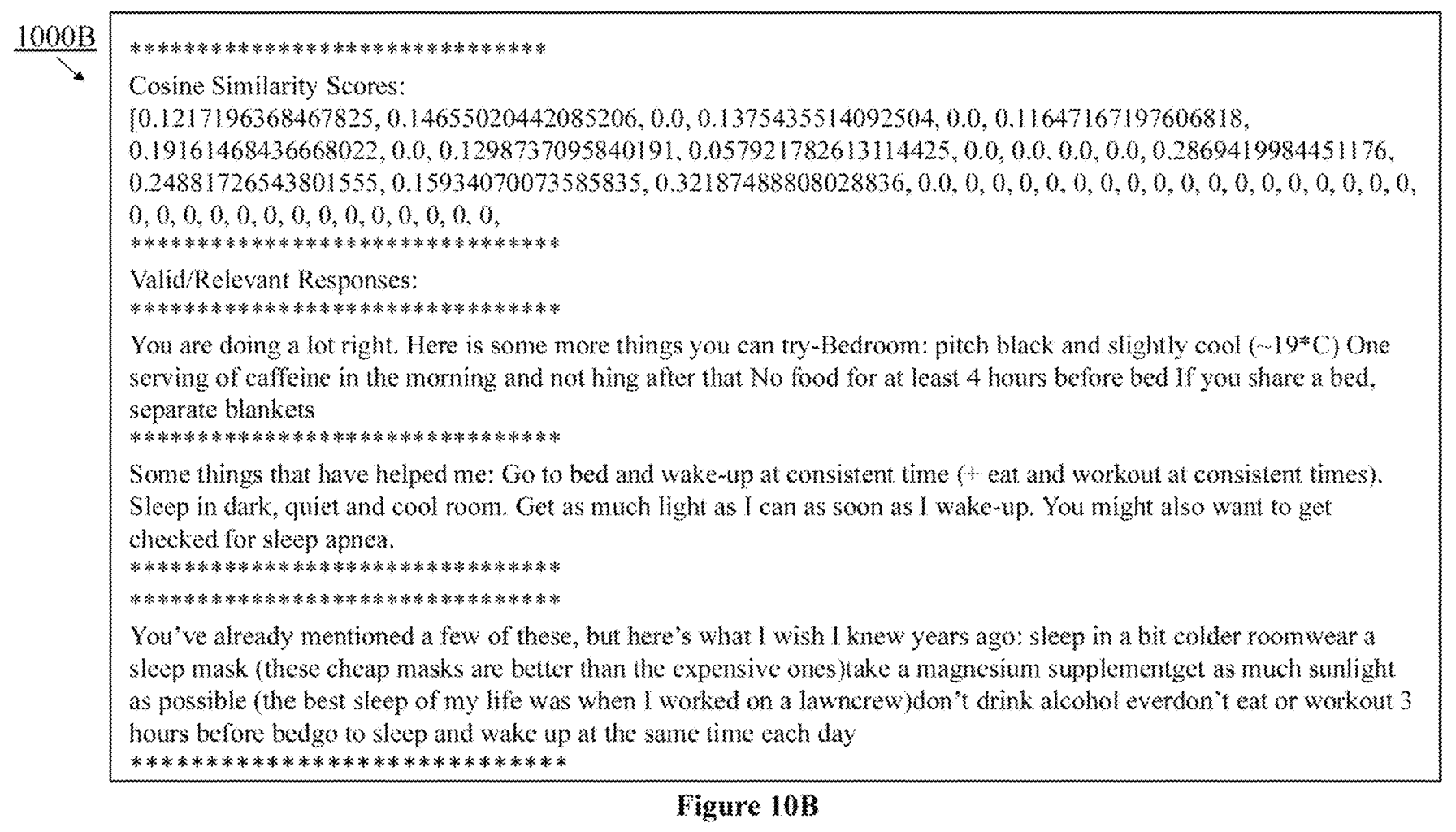

1000B

\*\*\*\*\*\*\*\*\*\*\*\*\*\*\*\*\*\*\*\*\*\*\*\*\*\*\*\*

Cosine Similarity Scores:

[0.1217196368467825, 0.14655020442085206, 0.0, 0.13754355140092504, 0.0, 0.11647167197606818, 0.19161468436668022, 0.0, 0.12987370095840191, 0.057921782613114425, 0.0, 0.0, 0.0, 0.28694199844511176, 0.2488172654380155, 0.1593407007358583, 0.32187488880802883, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0, 0.0,

\*\*\*\*\*\*\*\*\*\*\*\*\*\*\*\*\*\*\*\*\*\*\*\*\*\*\*\*

Valid/Relevant Responses:

\*\*\*\*\*\*\*\*\*\*\*\*\*\*\*\*\*\*\*\*\*\*\*\*\*\*\*\*

You are doing a lot right. Here is some more things you can try-Bedroom: pitch black and slightly cool (~19\*C) One serving of caffeine in the morning and not hing after that No food for at least 4 hours before bed If you share a bed, separate blankets

\*\*\*\*\*\*\*\*\*\*\*\*\*\*\*\*\*\*\*\*\*\*\*\*\*\*\*\*

Some things that have helped me: Go to bed and wake-up at consistent time (+ eat and workout at consistent times). Sleep in dark, quiet and cool room. Get as much light as I can as soon as I wake-up. You might also want to get checked for sleep apnea.

\*\*\*\*\*\*\*\*\*\*\*\*\*\*\*\*\*\*\*\*\*\*\*\*\*\*\*\*

\*\*\*\*\*\*\*\*\*\*\*\*\*\*\*\*\*\*\*\*\*\*\*\*\*\*\*\*

You've already mentioned a few of these, but here's what I wish I knew years ago: sleep in a bit colder roomwear a sleep mask (these cheap masks are better than the expensive ones)take a magnesium supplementget as much sunlight as possible (the best sleep of my life was when I worked on a lawncrew)don't drink alcohol everdon't eat or workout 3 hours before bedgo to sleep and wake up at the same time each day

You are doing a lot right. Here is some more things you can try-Bedroom: pitch black and slightly cool (~19°C) One serving of caffeine in the morning and nothing after that No food for at least 4 hours before bed If you share a bed, separate blankets Sentiment Scores:
{'neg': 0.0, 'neu': 0.876, 'pos': 0.124, 'compound': 0.6243}
Intent Scores: 0.028112449799196804
***************************************

Some things that have helped me: Go to bed and wake-up at consistent time (+ eat and workout at consistent times). Sleep in dark, quiet and cool room. Get as much light as I can as soon as I wake-up. You might also want to get checked for sleep apnea.

Sentiment Scores:
{'neg': 0.0, 'neu': 0.974, 'pos': 0.026, 'compound': 0.0772}
Intent Scores: 0.023809523809523836
***************************************

You've already mentioned a few of these, but here's what I wish I knew years ago: sleep in a bit colder roomwear a sleep mask (these cheap masks are better than the expensive ones)take a magnesium supplementget as much sunlight as possible (the best sleep of my life was when I worked on a lawncrew)don't drink alcohol everdon't eat or workout 3 hours before bedgo to sleep and wake up at the same time each day Sentiment Scores:
{'neg': 0.0, 'neu': 0.847, 'pos': 0.153, 'compound': 0.9349}
Intent Scores: 0.014563106796116498

Figure 10D:
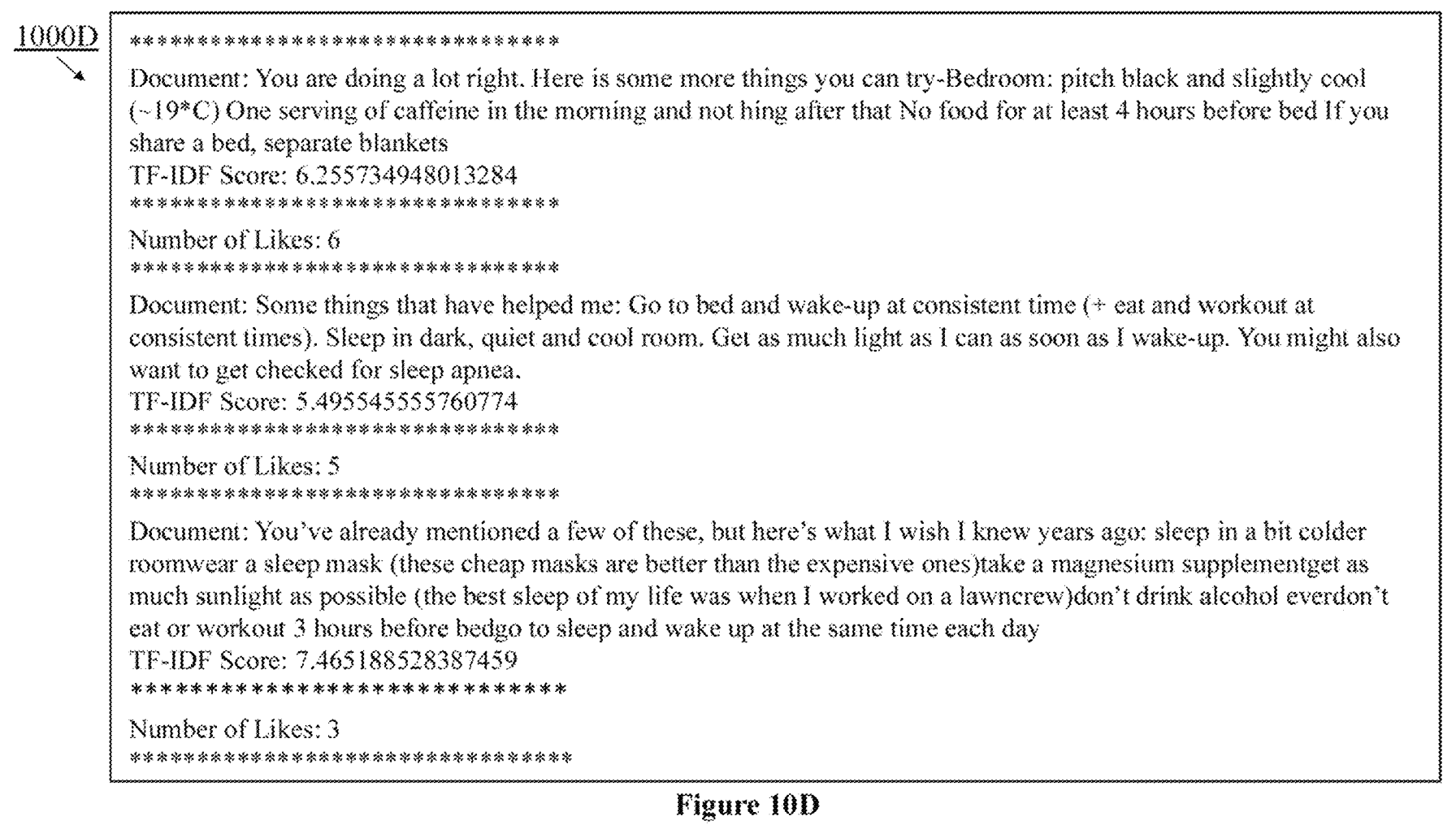

Document: You are doing a lot right. Here is some more things you can try-Bedroom: pitch black and slightly cool (~19*C) One serving of caffeine in the morning and nothing after that No food for at least 4 hours before bed If you share a bed, separate blankets TF-IDF Score: 6.25573494801 3284

\*\*\*\*\*\*\*\*\*\*\*\*\*\*\*\*\*\*\*\*\*\*\*\*\*\*\*\*\*\*\*\*\*

Number of Likes: 6

\*\*\*\*\*\*\*\*\*\*\*\*\*\*\*\*\*\*\*\*\*\*\*\*\*\*\*\*\*\*\*\*\*

Document: Some things that have helped me: Go to bed and wake-up at consistent time (+ eat and workout at consistent times) Sleep in dark, quiet and cool room. Get as much light as I can as soon as I wake-up. You might also want to get checked for sleep apnea.

TF-IDF Score: 5.49545555760774

\*\*\*\*\*\*\*\*\*\*\*\*\*\*\*\*\*\*\*\*\*\*\*\*\*\*\*\*\*\*\*\*\*

Number of Likes: 5

\*\*\*\*\*\*\*\*\*\*\*\*\*\*\*\*\*\*\*\*\*\*\*\*\*\*\*\*\*\*\*\*\*

Document: You've already mentioned a few of these, but here's what I wish I knew years ago: sleep in a bit colder roomwear a sleep mask (these cheap masks are better than the expensive ones)take a magnesium supplementget as much sunlight as possible (the best sleep of my life was when I worked on a lawncrew)don't drink alcohol everdon't eat or workout 3 hours before bedgo to sleep and wake up at the same time each day TF-IDF Score: 7.46518852387459

\*\*\*\*\*\*\*\*\*\*\*\*\*\*\*\*\*\*\*\*\*\*\*\*\*\*\*\*\*\*\*\*\*

Number of Likes: 3

SYSTEM AND METHOD FOR OPTIMIZING QUERY RESOLUTION ON DIGITAL CHANNELS IN A CONTACT CENTER

COPYRIGHT NOTICE

TECHNICAL FIELD

The present disclosure relates to the field of data analysis and Natural Language Processing (NLP), and more specifically to resolution of a query posted on an online discussion board of a social-media platform integrated to a contact center and awaiting in a queue of a digital communication channel of the social-media platform.

BACKGROUND

With the advent of digital channels, prompt and precise response to customers queries is one of the most critical aspects, in contact centers. Since the queries on the digital channels are mostly on public domains, such queries also receive many responses from responders, via an online discussion board of a social-media platform, including unrelated communication, which makes query resolution more complex and time consuming. However, there are scenarios in which suitable solutions are provided by the responders which can be of great benefit to the customer that is the query originator. Thus, customers which are online self-solving problems on user forums in social media, may be leveraged and potential massive source of knowledge may be used.

Hence, there is a need for a technical solution that will derive the context of the query and will correlate a resolution of the query from responders when there are actual solutions proposed by the query responders which may resolve the query of the customer. The technical solution may include sending the query resolution to the customer as an instant tryout option and also to the agents to whom query is assigned for a faster resolution of the query.

There is a need for a technical solution for optimizing query resolution on digital channels in a contact center by resolving a query of a customer posted on an online discussion board of a social-media platform integrated to a contact center and wait for an available agent in a queue of a digital communication channel of the social-media platform.

SUMMARY

There is thus provided, in accordance with some embodiments of the present disclosure, a computerized-method for resolving a query of a customer posted on an online discussion board of a social-media platform integrated to a contact center and awaiting in a queue of a digital communication channel of the social-media platform.

Furthermore, in accordance with some embodiments of the present disclosure, the computerized-method may include: (i) monitoring, by one or more processors, the digital communication channel queue to select the query of the customer. The queue of the digital communication channel may include a plurality of queries that await an available agent who can resolve the queries; (ii) operating, by the one or more processors, an interaction-filtering module against the query of the customer to tag one or more responses that were posted in a communication thread of the query of the customer in the online discussion board of the social media, as valid; (iii) calculating a resolution-confidence score for each response of the one or more responses that were tagged as valid, by operating by the one or more processors a responder-recommended module; (iv) selecting a response from the one or more responses that were tagged as valid that is above a preconfigured threshold and having a highest calculated resolution-confidence score; (v) automatically sending by the one or more processors the selected response to the customer as a tryout-solution to the query via the digital communication channel of the social-media platform; and (vi) upon receiving an indication from the customer via the digital communication channel of the social-media platform, that the query of the customer is resolved, removing the query of the customer from the queue of the digital communication channel of the social-media platform, such that the available agent is not assigned the query of the customer.

Furthermore, in accordance with some embodiments of the present disclosure, the interaction-filtering module may include: (i) retrieving one or more responses that were posted in a communication thread of the query of the customer in the online discussion board of the social media; (ii) validating each response in the retrieved one or more responses by using a Natural Language Processing (NLP) tool to analyze the response and filter-out irrelevant responses. Irrelevant responses are responses that their analysis indicates that they don't match the query; and (iii) tagging as valid the validated responses that were not filtered-out.

Furthermore, in accordance with some embodiments of the present disclosure, the responder-recommended module may include for each response of the one or more responses that were tagged as valid: (i) calculating a Cosine Similarity Score (CSS); (ii) calculating a recommendation score according to formula I:

$$\text{recommendation score} = (\text{sentiment score} + \tag{I}$$
$$\text{intent classification score} + \text{keyword extract score} + CSS),$$

whereby:

the sentiment score is a sum of polarity value and subjectivity value of the response, the intent classification score is an indication of intent of a responder of the response to resolve the query of the customer, the keyword extract score is a number of matching keywords in the response and the query of the customer, and the CSS is a measurement of similarity between the response and the query of the customer, (iii) calculating the resolution-confidence score according to formula II:

$$resolution-confidence \; score = weighted \; average \; (number \; of \; likes + \quad (II)$$
$$number \; of \; responses) * recommendation \; score,$$

whereby:

the number of likes is a count of users who have liked the response that was posted in a communication thread of the query of the customer in the online discussion board of the social media, the number of responses is a number of responses that were posted in a communication thread of the query of the customer in the online discussion board of the social media, and the recommendation score is the calculated recommendation score.

Furthermore, in accordance with some embodiments of the present disclosure, the CSS may be calculated by: (i) tokenizing the query of the customer into words; (ii) generating a word embedding of the tokenized query of the customer to represent it as a query-vector. The query-vector has one or more query-entries; (iii) normalizing the query-vector by dividing each entry in the query-vector by its magnitude to create a unit query-vector; (iv) tokenizing the response into words; (v) generating word embedding of the response to represent is as a response-vector. The response-vector has one or more response-entries, (vi) normalizing the response-vector by dividing each entry in the response-vector by its magnitude to create a unit response-vector; and (vii) calculating the CSS according to formula III:

$$CSS = Dot \; Product / \|customer \; query \; vector\| * \|response \; vector,\| \quad (III)$$

whereby:

the Dot Product is a sum of each query-entry in the unit query-vector multiplied by corresponding response-entry in the unit response-vector, the customer query vector is the unit query-vector, and the response vector is the unit response-vector.

Furthermore, in accordance with some embodiments of the present disclosure, when no indication has been received from the customer via the digital communication channel that the query is resolved, the computerized-method may further include displaying the tagged one or more responses sorted in descending manner by the calculated resolution-confidence score to an agent via a display unit, when the query is assigned to the agent.

Furthermore, in accordance with some embodiments of the present disclosure, the computerized-method further comprising, after sending the selected response to the customer as a tryout-solution to the query via the digital communication channel and receiving an indication from the customer that the response didn't resolve the query, repeatedly selecting a response having next highest calculated resolution-confidence score to the customer as the tryout-solution until receiving an indication from the customer via the digital communication channel that the query is resolved or all the tagged one or more responses have been sent to the customer.

Furthermore, in accordance with some embodiments of the present disclosure, the computerized-method may further include, after sending the selected response to the customer as a tryout-solution to the query via the digital communication channel and receiving an indication from the customer that the response didn't resolve the query, repeatedly selecting a response having next highest calculated resolution-confidence score to the customer as the tryout-solution until receiving an indication from the customer via the digital communication channel that the query is resolved or all the tagged one or more responses have been sent to the customer.

Furthermore, in accordance with some embodiments of the present disclosure, the computerized-method may further include: (i) discarding responses having the resolution-confidence score below the preconfigured threshold; (ii) storing responses having the resolution-confidence score above the preconfigured threshold with the query of the customer, in a knowledgebase database; and (iii) retrieving the responses to the query of the customer and presenting them via an agent dashboard when a different customer is posting a new query that is similar to the query of the customer.

There is further provided, in accordance with some embodiments of the present disclosure, a computerized-system for resolving a query of a customer posted on an online discussion board of a social-media platform integrated to the contact center and awaiting in a queue of a digital communication channel of the social-media platform.

Furthermore, in accordance with some embodiments of the present disclosure, the computerized-system may include one or more processors. The one or more processors may be configured to: (i) monitor the digital communication channel queue to select the query of the customer. The queue of the digital communication channel may include a plurality of queries that await an available agent who can resolve the queries; (ii) operate interaction-filtering module against the query of the customer to tag one or more responses that were posted in a communication thread of the query of the customer in the online discussion board of the social media, as valid; (iii) calculate a resolution-confidence score for each response of the one or more responses that were tagged as valid, by operating a responder-recommended module; (iv) select a response from the one or more responses that were tagged as valid that is above a preconfigured threshold and having a highest calculated resolution-confidence score; (v) automatically send the selected response to the customer as a tryout-solution to the query via the digital communication channel of the social-media platform; and (vi) upon receiving an indication from the customer via the digital communication channel of the social-media platform, that the query of the customer is resolved, remove the query of the customer from the queue of the digital communication channel of the social-media platform such that the available agent is not assigned the query of the customer.

BRIEF DESCRIPTION OF THE DRAWINGS

FIGS. 2A-2B are a high-level workflow of a computerized-method for resolving a query of a customer posted on an online discussion board of a social-media platform integrated to a contact center and awaiting in a queue of a digital communication channel of the social-media platform, in accordance with some embodiments of the present disclosure;

FIG. 4 is an example of a graph showing a cosine similarity calculation, in accordance with some embodiments of the present disclosure;

FIG. 5 is a high-level workflow for selecting a valid response, in accordance with some embodiments of the present disclosure;

FIGS. 8A-8C are a decision diagram for selecting a valid response, in accordance with some embodiments of the present disclosure;

FIGS. 10A-10E show an example of a query of a customer and responses that were posted in a communication thread of the query of the customer in the online discussion board of the social media, in accordance with some embodiments of the present disclosure.

DETAILED DESCRIPTION

Figure 1A:
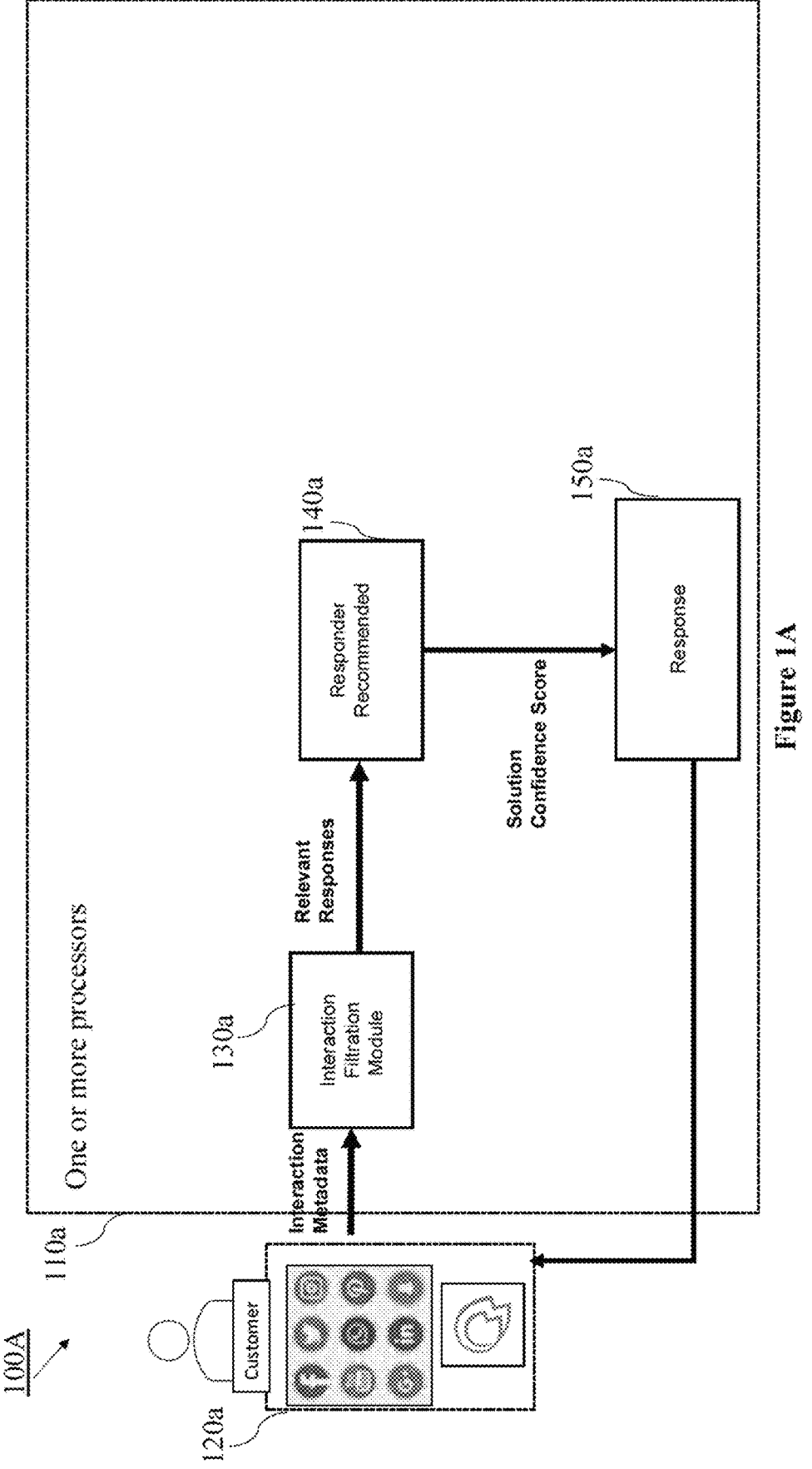
FIGS. 1A-1B schematically illustrate a high-level diagram of a system for resolving a query of a customer posted on an online discussion board of a social-media platform integrated to a contact center and awaiting in a queue of a digital communication channel of the social-media platform, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

On social media customer service inquiries, timely responses are rewarded. For example, more than 50 percent of Facebook® users and 80 percent of those on Twitter® expect their inquiries to be answered within one day or less. If they don't respond fast enough, studies show that 15 percent of their customers are likely to leave the business, and many of those for competitors. So, while social media is a great tool for harnessing fast response time and public replies for any call center, agents have to respond quickly.

44% of consumers reported having received an incorrect answer from a customer agent in the past. 2.72% of consumers are found explaining their problems to multiple agents and are unhappy with the service. After a bad customer-support experience, 39% of customers will avoid the company and look for an alternative. 4.56% of people around the world have stopped doing business with a company due to unsatisfactory customer service. Four out of ten consumers will not recommend others a business with which they had poor customer experience.

If a contact center can resolve the issues quickly and successfully, they would have won a customer for their lifetime. The customers will return again and again, thus, boosting revenue and profits. On the other hand, if the handling is poor, the customers may be expected to bolt to the closest competitor.

FIG. 1A schematically illustrates a high-level diagram of a system 100A for resolving a query of a customer posted on an online discussion board of a social-media platform integrated to a contact center and awaiting in a queue of a digital communication channel of the social-media platform, in accordance with some embodiments of the present disclosure.

According to some embodiments of the present disclosure, a system, such as system 100A, may implement a computerized-method, such as computerized-method 200 in FIG. 2 for resolving a query of a customer posted on an online discussion board of a social-media platform integrated to a contact center and awaiting in a queue of a digital communication channel of the social-media platform.

According to some embodiments of the present disclosure, system 100A may monitor each digital communication channel queue 120a that may include a plurality of queries that await an available agent who can resolve the queries, and for each query in the digital communication channel queue filter out irrelevant responder responses by operating, by the one or more processors 110a, a module, such as interaction-filtering module 130a against the query of the customer to tag one or more responses that were posted in a communication thread of the query of the customer in the online discussion board of the social media, as valid. The communication thread is a string of messages, which begins with an initial message, e.g., the query of the customer and then continues as a series of responses or comments.

According to some embodiments of the present disclosure, system 100A may determine a solution confidence score by calculating a resolution-confidence score for each response of the responses that were tagged as valid, by operating by the one or more processors 110a, a module, such as responder-recommended module 140a.

According to some embodiments of the present disclosure, a response that has been tagged as valid, has a resolution-confidence score above a preconfigured threshold and has a highest calculated resolution-confidence score may be selected and may be automatically sent to the customer as a tryout-solution to the query via the digital communication channel of the social-media platform. Upon receiving an indication from the customer via the digital communication channel of the social-media platform, that the query of the customer is resolved, the query of the customer may be removed from the queue of the digital communication channel of the social-media platform, such that the available agent is not assigned the query of the customer.

According to some embodiments of the present disclosure, optionally, a plurality of responses which have a resolution-confidence score above the preconfigured threshold may be iteratively sent to the customer as a tryout solution until an indication from the customer may be received via the digital communication channel of the social-media platform, that the query of the customer is resolved. Then, the query of the customer may be removed from the queue of the digital communication channel of the social-media platform, such that the available agent is not assigned the query of the customer.

Figure 1B:
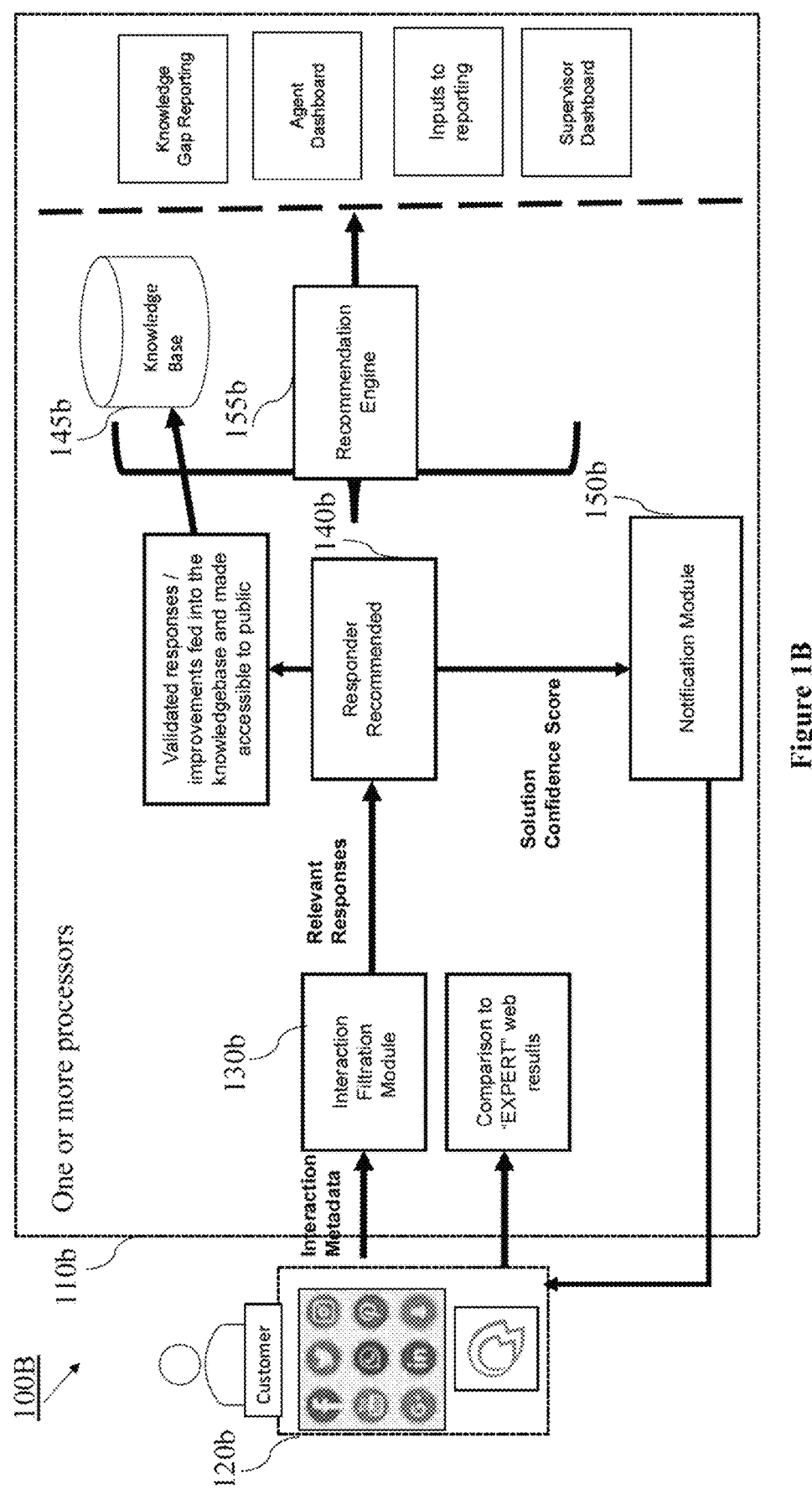

According to some embodiments of the present disclosure, optionally, a recommended solution for the query of the customer may be extracted from the plurality of responses which have a resolution-confidence score above the preconfigured threshold, for example, by operating a notification module, such as notification module 150b in FIG. 1B. The recommended solution may be displayed via a UI at the agent desktop. Alternatively, the plurality of responses having a resolution-confidence score above the preconfigured threshold may be displayed to the agent via a UI, such as UI 1100 in FIG. 11 in a descending order.

According to some embodiments of the present disclosure, optionally, a recommended solution for the query of the customer may be extracted from the plurality of responses which have a resolution-confidence score above the preconfigured threshold and may be stored in a database, such as knowledgebase 145b in FIG. 1B.

According to some embodiments of the present disclosure, optionally, the plurality of responses having a resolution-confidence score above the preconfigured threshold may be forwarded to a recommendation engine 155b in FIG. 1B, to operate a knowledge gap reporting to provide content for answers via a public website of the organization.

According to some embodiments of the present disclosure, system 100A may reduce the turnaround time for query resolution on the digital communication channels leading to increased customer satisfaction and high agent morale. Furthermore, system 100A may reduce the average handling time and decreased response time in the contact center.

According to some embodiments of the present disclosure, in a system, such as system 100A for resolving a query of a customer posted on an online discussion board of a social-media platform integrated to a contact center and awaiting in a queue of a digital communication channel of the social-media platform, the one or more processors 110a may monitor the digital communication channel queue 120a to select the query of the customer.

According to some embodiments of the present disclosure, the digital communication channel queue 120a may be a queue of queries that have been posted via one of the social-media platforms, such as Facebook®, Twitter®, TouTube® and the like. The queue of the digital communication channel 120a may include a plurality of queries that await an available agent who can resolve the queries for each customer.

According to some embodiments of the present disclosure, the one or more processors 110a may operate a module, such as interaction-filtering module 130a against the query of the customer to tag one or more responses that were posted in a communication thread of the query of the customer in the online discussion board of the social media, as valid, such that irrelevant responder responses may be filtered out. The interaction-filtering module 130a may fetch all responses received on the query posted on the digital communication channel. The responses may be included in an interaction metadata of the query that the customer posted on the online discussion board. The response may be incremental responses from other users on the query of a customer posted on an online discussion board of a social-media platform. The interaction-filtering module 130a may pull the incremental responses. Then, by using a Natural Language Processing (NLP) tool system 100A may filter out all irrelevant responses and valid responses may be passed on for further processing.

According to some embodiments of the present disclosure, the interaction-filtering module 130a may retrieve the responses that were posted in a communication thread of the query of the customer in the online discussion board of the social media and then may validate each response in the retrieved responses by using the NLP tool to analyze the response and filter-out irrelevant responses. The irrelevant responses are responses that their analysis indicates that they don't match the query content. The interaction-filtering module 130a may tag as valid the validated responses that were not filtered-out. The NLP tools may be for example, Natural Language Toolkit (NLTK), spaCy, Bidirectional Encoder Representations from Transformers (BERT) and the like.

According to some embodiments of the present disclosure, a resolution-confidence score may be calculated for each response that was tagged as valid. The calculation of the resolution-confidence score may be performed by operating by the one or more processors 110a a module, such as responder-recommended module 140a.

According to some embodiments of the present disclosure, the responder-recommended module 140a may generate the resolution-confidence score based on the valid responses and may send all responses having a resolution-confidence score above a predefined threshold for further processing.

According to some embodiments of the present disclosure, optionally, a module may evaluate responses based on certain criteria, and based on the criteria, decides whether to pass them on for further processing.

According to some embodiments of the present disclosure, the resolution-confidence score may be a metric that may be assigned to each response which may indicate the level of confidence of system 100A in the accuracy or usefulness of the response. The resolution-confidence score may be based on factors, such as the source of the response, the quality of the information provided, and how well it aligns with known expertise or standards.

According to some embodiments of the present disclosure, the preconfigured threshold for the resolution-confidence score may indicate a cutoff point for responses with a score above it that may be forwarded for further processing.

According to some embodiments of the present disclosure, optionally, the interaction-filtering module 130a against the query of the customer may validate each response to ensure they meet certain criteria or standards, such as checking for coherence, relevance, factual accuracy, or adherence to specified guidelines. For example, when a customer wants to know about the company's return policy, then the response should focus on the company's return policy and avoid discussing unrelated topics, such as shipping policy. The information provided in the response should accurately reflect the company's official return policy as documented on its website and should use a professional and customer-friendly tone.

According to some embodiments of the present disclosure, the responder-recommended module 140a may calculate the resolution-confidence score for each response of the responses that were tagged as valid, by calculating a Cosine Similarity Score (CSS), which is a measurement that quantifies similarity between two or more vectors. By tokenizing questions and answers, e.g., responses, the similarity between the query of the customer and each response, may be compared, for example, as shown in FIG. 4.

According to some embodiments of the present disclosure, the CSS may be calculated by tokenizing the query of the customer into words and then generating a word embedding of the tokenized query of the customer to represent it as a query-vector. The query-vector has one or more query-entries. Then, normalizing the query-vector by dividing each entry in the query-vector by its magnitude to create a unit query-vector and tokenizing the response into words. Unit query-vector involves converting the textual query into a numerical representation using techniques such as word embeddings. These techniques map words or phrases to vectors in a high-dimensional space, capturing semantic meaning and relationships between words. Tokenization is the process of breaking down a piece of text into smaller units called tokens. In the context of NLP, tokens are typically words, phrases, or other meaningful units of text.

According to some embodiments of the present disclosure, the word embedding of the response may be generated to represent it as a response-vector. The response-vector may have one or more response-entries, and then normalizing the response-vector by dividing each entry in the response-vector by its magnitude to create a unit response-vector.

According to some embodiments of the present disclosure, calculating the CSS according to formula III:

$$CSS = \text{Dot Product} / \|\text{customer query vector}\| * \|\text{response vector}\|, \quad \text{(III)}$$

whereby:
the Dot Product is a sum of each query-entry in the unit query-vector multiplied by corresponding response-entry in the unit response-vector,
the customer query vector is the unit query-vector, and
the response vector is the response-vector.

According to some embodiments of the present disclosure, the responder-recommended module 140a may calculate a recommendation score according to formula I:

$$\text{recommendation score} = (\text{sentiment score} + \quad \text{(I)}$$
$$\text{intent classification score} + \text{keyword extract score} + CSS),$$

whereby:
the sentiment score is a sum of polarity value and subjectivity value of the response,
the intent classification score is an indication of intent of a responder of the response to resolve the query of the customer,
the keyword extract score is a number of matching keywords in the response and the query of the customer, and
tomer, and the CSS is a measurement of similarity between the response and the query of the customer.

Figure 10A:
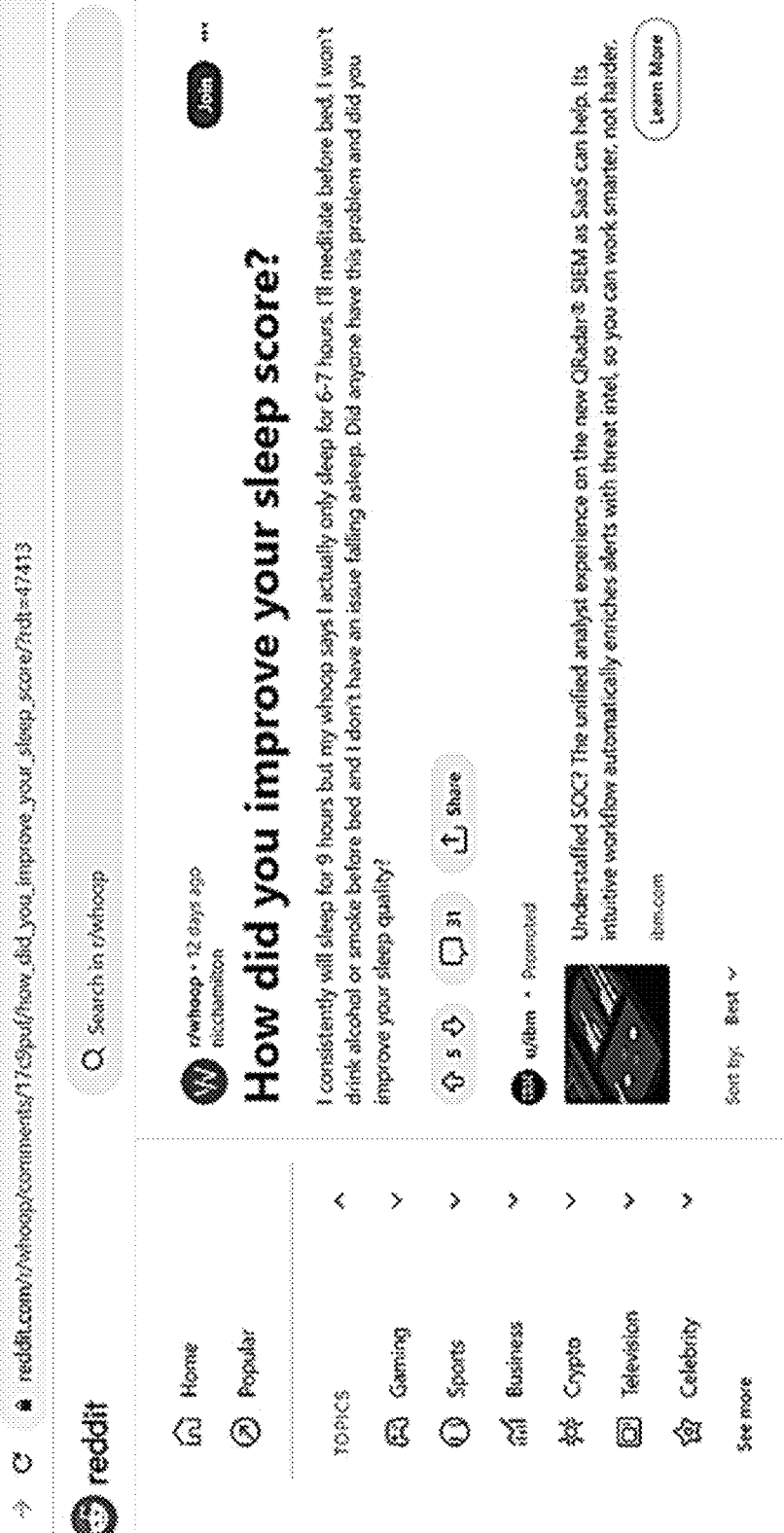

According to some embodiments of the present disclosure, the responder-recommended module 140a may calculate the resolution-confidence score according to formula II:

$$\text{resolution-confidence score} = \text{weighted average (number of likes} + \quad \text{(II)}$$
$$\text{number of responses)} * \text{recommendation score},$$

whereby:
the number of likes is a count of users who have liked the response that was posted in a communication thread of the query of the customer in the online discussion board of the social media, e.g., as shown in FIG. 10D,
the number of responses is a number of responses that were posted in a communication thread of the query of the customer in the online discussion board of the social media, and
the recommendation score is the calculated recommendation score. For example, as shown in FIGS. 10A-10E.

According to some embodiments of the present disclosure, the one or more processors 110a may select a response from the responses that were tagged as valid that is above a preconfigured threshold and having a highest calculated resolution-confidence score and may automatically send the selected response 150a to the customer as a tryout-solution to the query via the digital communication channel of the social-media platform.

According to some embodiments of the present disclosure, upon receiving an indication from the customer via the digital communication channel of the social-media platform, that the query of the customer is resolved, the query of the customer may be removed from the queue of the digital communication channel of the social-media platform, such that the available agent is not assigned the query of the customer.

Figure 11:
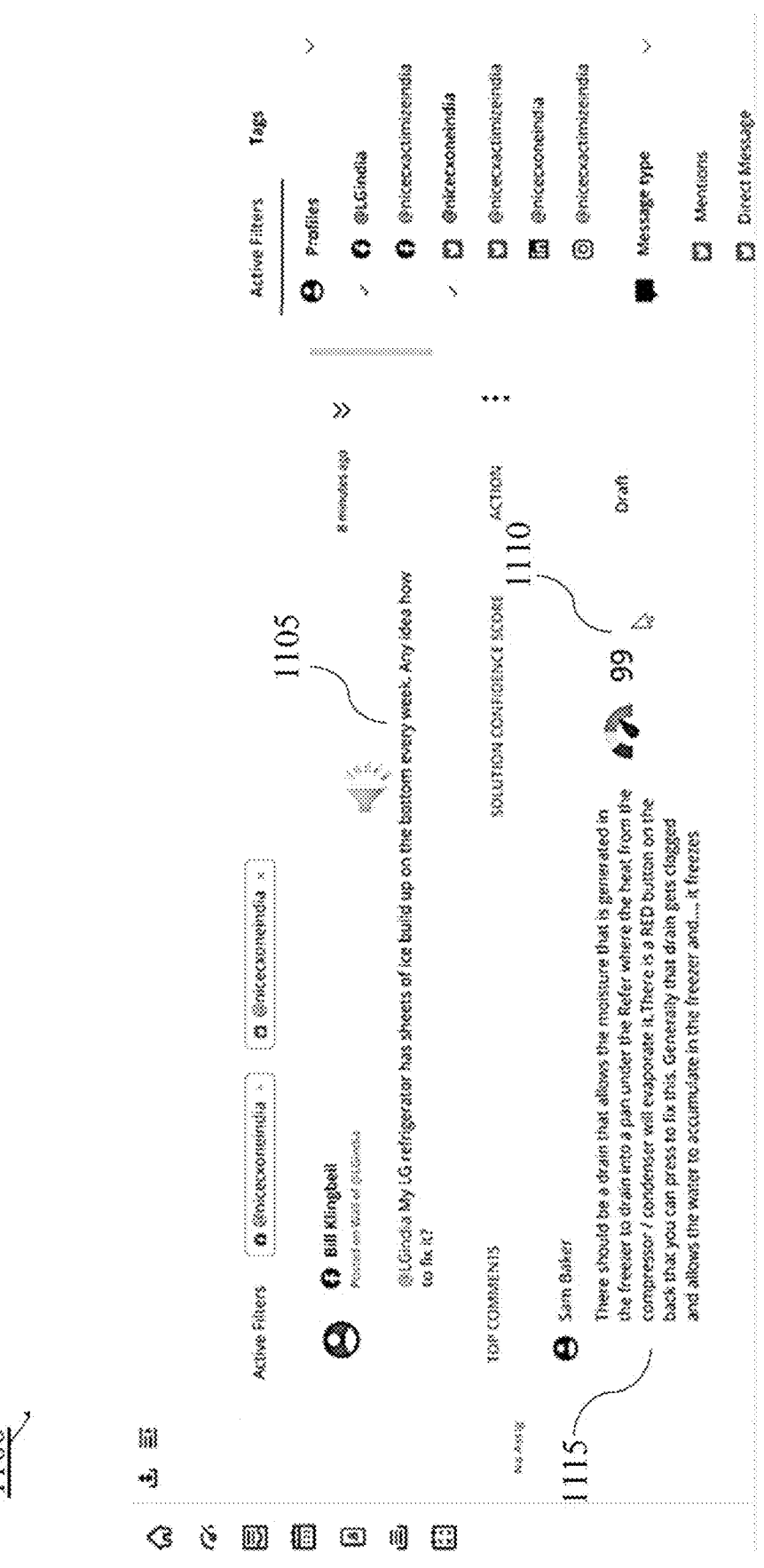
FIG. 11 is an example of a UI for an agent dashboard with a query of a customer and a response that was posted in a communication thread of the query of the customer in the online discussion board of the social media, in accordance with some embodiments of the present disclosure.

According to some embodiments of the present disclosure, when no indication has been received from the customer via the digital communication channel that the query is resolved, the tagged responses may be displayed sorted in descending manner by the calculated resolution-confidence score to an agent via a display unit, when the query is assigned to the agent. For example, as shown in FIG. 11.

According to some embodiments of the present disclosure, after sending the selected response 150a to the customer, as a tryout-solution to the query via the digital communication channel and receiving an indication from the customer that the response didn't resolve the query, the one or more processors 110a may repeatedly select a response having next highest calculated resolution-confidence score to the customer as the tryout-solution, until an indication may be received, from the customer, via the digital communication channel, that the query is resolved or all the tagged responses have been sent to the customer.

According to some embodiments of the present disclosure, the one or more processors 110a may be further configured to discard responses having the resolution-confidence score below the preconfigured threshold.

According to some embodiments of the present disclosure, the one or more processors may be further configured to retrieve the responses to the query of the customer and presenting them via an agent dashboard when a different customer is posting a new query that is similar to the query of the customer.

FIG. 1B schematically illustrates a high-level diagram of a system 100B for resolving a query of a customer posted on an online discussion board of a social-media platform integrated to a contact center and awaiting in a queue of a digital communication channel of the social-media platform, in accordance with some embodiments of the present disclosure.

According to some embodiments of the present disclosure, system 100B may include similar components as system 100A in FIG. 1A.

According to some embodiments of the present disclosure, system 100B may filter out irrelevant responder responses that were posted in a communication thread of the query of the customer in the online discussion board of the social media to a query of a customer that has been posted on an online discussion board of a social-media platform which is integrated to the contact center and awaiting in the queue of the digital communication channel of the social-media platform 120b.

According to some embodiments of the present disclosure, the irrelevant responder responses may be filtered out by a module such as interaction filtration module 130b, and such as interaction filtration module 130a in FIG. 1A. Each responder response may be calculated a resolution-confidence score, by the one or more processors 110b operating a responder recommended module 140b.

According to some embodiments of the present disclosure, the interaction filtration module 130b may tag a response as a relevant solution and may forward it to the customer while the query is still awaiting in digital communication queue.

According to some embodiments of the present disclosure, a recommended solution for the query may be extracted for all the responses that were tagged as valid by the interaction filtration module 130b and have a resolution-confidence score above a preconfigured threshold.

According to some embodiments of the present disclosure, optionally, the recommended solution may be stored in a database, such as knowledgebase 145b and may be publicly accessible via a website.

According to some embodiments of the present disclosure, optionally, the recommended solution may be further forwarded by a recommendation engine 155b to be displayed on an agent desktop, as shown in FIG. 11 while the agent is handling the query of the customer.

According to some embodiments of the present disclosure, a module, such as notification module 150b may receive a plurality of responses having the resolution-confidence score above the preconfigured threshold and may display the responses on the agent desktop in descending order with the associated resolution-confidence score.

According to some embodiments of the present disclosure, system 100B may operate a recommendation engine 155b to provide a knowledge gap reporting which provides the content that is being answered by the public web based on the plurality of responses having a resolution-confidence score above the preconfigured threshold.

According to some embodiments of the present disclosure, system 100B may ensure filtering out irrelevant responder responses that were posted in a communication thread of the query of the customer in the online discussion board of the social media by using Cosine Similarity and determining a resolution-confidence score against each relevant response. Each response having a resolution-confidence score above a preconfigured threshold may be tagged as a relevant solution for customers.

According to some embodiments of the present disclosure, the inputs received from the interaction filtration module 130b for relevant responses may be processed by the responder recommended module 140b and a resolution-confidence score may be calculated for each relevant response.

According to some embodiments of the present disclosure, when the resolution-confidence score is above the preconfigured threshold, the one or more processors 110b may send the response to a module, such as notification module 150b, as a recommended response.

According to some embodiments of the present disclosure, system 100B may indirectly use content of creators through the power of crowdsourcing of responses that were posted in a communication thread of the query of the customer in the online discussion board of the social media.

According to some embodiments of the present disclosure, system 100B may highlight as to knowledge gap by generating a knowledge gap reporting based on the plurality of responses having a resolution-confidence score above the preconfigured threshold and existing solutions in the knowledgebase 145b. It may show companies where customers are struggling with their product and point to internal knowledge managers where to focus on customer and agent knowledge.

FIGS. 2A-2B are a high-level workflow of a computerized-method 200 for resolving a query of a customer posted on an online discussion board of a social-media platform integrated to a contact center and awaiting in a queue of a digital communication channel of the social-media platform, in accordance with some embodiments of the present disclosure.

According to some embodiments of the present disclosure, a system, such as system 100A and such as system 100B may implement a computerized-method, such as computerized-method 200 for resolving a query of a customer posted on an online discussion board of a social-media platform integrated to a contact center and awaiting in a queue of a digital communication channel of the social-media platform.

According to some embodiments of the present disclosure, operation 210 comprising monitoring, by one or more processors, the digital communication channel queue to select the query of the customer. The queue of the digital communication channel comprising a plurality of queries that await an available agent who can resolve the queries.

According to some embodiments of the present disclosure, operation 220 comprising operating, by the one or more processors, an interaction-filtering module against the query of the customer to tag one or more responses that were posted in a communication thread of the query of the customer in the online discussion board of the social media, as valid.

According to some embodiments of the present disclosure, operation 230 comprising calculating a resolution-confidence score for each response of the one or more responses that were tagged as valid, by operating by the one or more processors a responder-recommended module.

According to some embodiments of the present disclosure, operation 240 comprising selecting a response from the one or more responses that were tagged as valid that is above a preconfigured threshold and having a highest calculated resolution-confidence score.

According to some embodiments of the present disclosure, operation 250 comprising automatically sending by the one or more processors the selected response to the customer as a tryout-solution to the query via the digital communication channel of the social-media platform.

According to some embodiments of the present disclosure, operation 260 comprising upon receiving an indication from the customer via the digital communication channel of the social-media platform, that the query of the customer is resolved, removing the query of the customer from the queue of the digital communication channel of the social-media platform, such that the available agent is not assigned the query of the customer.

Figure 3:
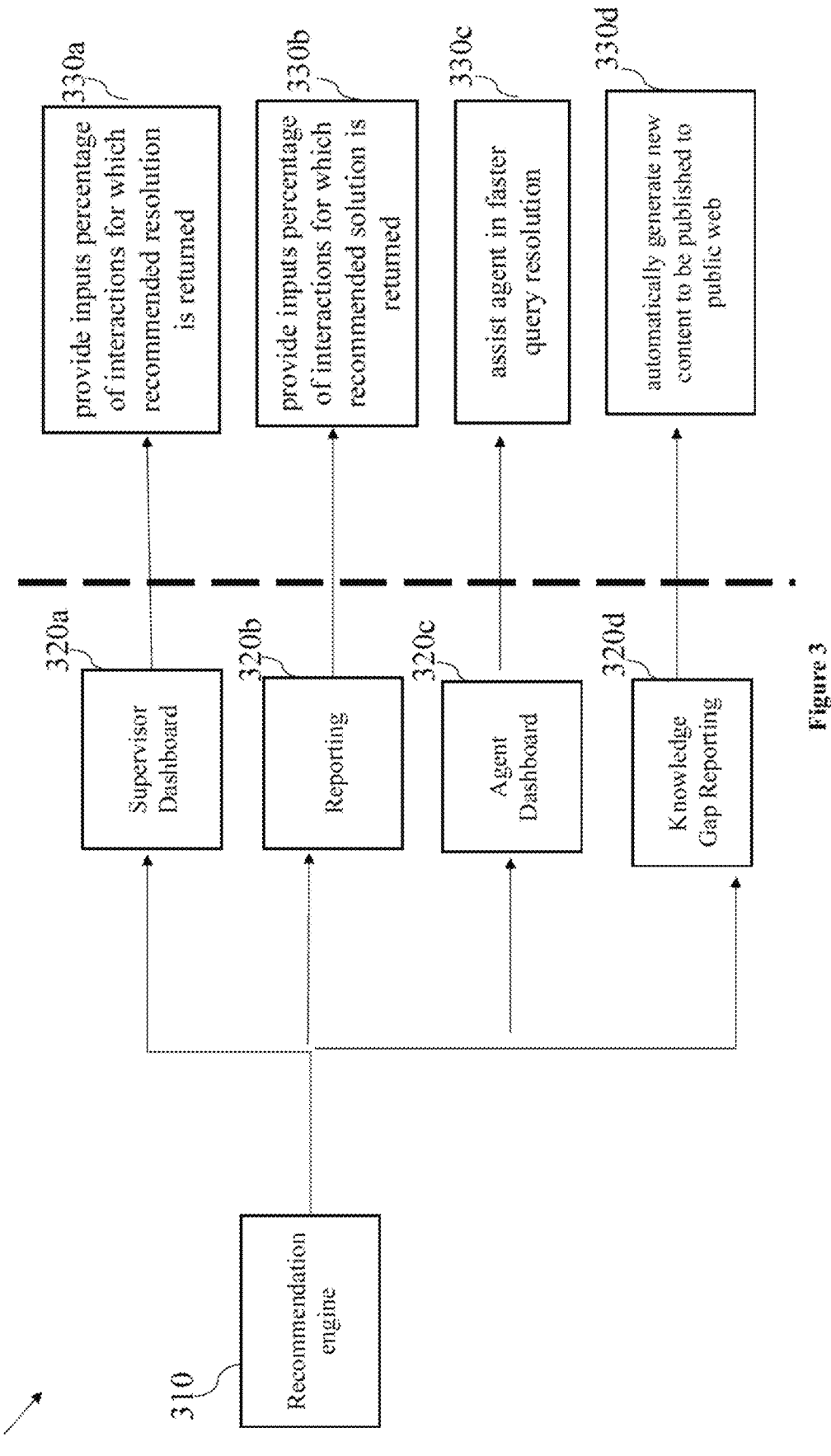
FIG. 3 is a high-level workflow of a recommendation engine, in accordance with some embodiments of the present disclosure.

FIG. 3 is a high-level workflow of a recommendation engine 300, in accordance with some embodiments of the present disclosure.

According to some embodiments of the present disclosure, optionally, a recommendation engine 310, such as recommendation engine 155b in FIG. 1B may forward to a supervisor dashboard 320a the percentage of queries that had a resolution based on responses that were posted in a communication thread of the query of the customer in the online discussion board of the social media from a total queries during a period, by providing inputs percentage of interactions for which recommended resolution is returned 330a. Such that the supervisor may check which percentage of interactions were "assisted interactions" which were resolved by a response with a resolution-confidence score above the preconfigured threshold. For example, "out of 100 customer queries, 70 were resolved by a response posted in a communication thread of the query of the customer in the online discussion board of the social media".

According to some embodiments of the present disclosure, optionally, the recommendation engine 310 may further forward information as to areas where there are major issues where the customers are struggling with, such that reporting 320b may be generated, According to some embodiments of the present disclosure, optionally, the recommendation engine 310 may further forward a plurality of responses having a resolution-confidence score above a preconfigured threshold to an agent dashboard 320c, while the agent is handling the query of the customer. Thus, assisting the agent in providing a faster query resolution 330c.

According to some embodiments of the present disclosure, optionally, the recommendation engine 310 may further forward a response having a highest resolution-confidence score from the plurality of responses having a resolution-confidence score above a preconfigured threshold to update a knowledgebase, such as knowledgebase 145b in FIG. 1B. Alternatively, the recommendation engine 310 may further forward plurality of responses having a resolution-confidence score above a preconfigured threshold for review for later on update of the knowledgebase. The response or plurality of responses may identify a knowledge gap reporting for automatically generating a new content to be publicly published in a website.

FIG. 4 is an example 400 of a graph showing a cosine similarity calculation, in accordance with some embodiments of the present disclosure.

According to some embodiments of the present disclosure, a Cosine Similarity Score (CSS) may be calculated for each response of the responses that were posted in a communication thread of the query of the customer in the online discussion board of the social media and were tagged as valid by a module, such as interaction-filtering module 130a in FIG. 1A, and such as interaction-filtering module 130b in FIG. 1B. The CSS may be calculated for each response to the query of the customer of the responses that were posted in a communication thread of the query of the customer in the online discussion board of the social media and were tagged as valid by a module, such as interaction-filtering module 130a in FIG. 1A and such as interaction-filtering module 130b in FIG. 1B.

According to some embodiments of the present disclosure, the Cosine Similarity measurement allows an insight into how the text vectors align between a question, e.g., query and the answers, e.g., the responses that were posted in a communication thread of the query of the customer in the online discussion board of the social media.

According to some embodiments of the present disclosure, the cosine angle is between the question vector and its associated answer vector. For example, when the angle is $20°$, then $\cos(20)=0.9397$ which is 94% similarity between the question and the answer. When CSS>0 then the response may be considered a valid response and the response along with the CSS will be sent for further processing. When CSS<0 then the response may be discarded. The CSS may be calculated according to the formula:

$$similarity(A, B) = \frac{A \cdot B}{\|A\| \times \|B\|} = \frac{\sum_{i=1}^{n} A_i \times B_i}{\sqrt{\sum_{i=1}^{n} A_i^2} \times \sqrt{\sum_{i=1}^{n} B_i^2}}$$

whereby:
A is a query-vector, and
B is a response-vector.

According to some embodiments of the present disclosure, for example, a query of the customer may be "I have Refrigerator where there are heaps of Ice Built up on the sheet. How to fix this?" A replied by another user, may be "There is a red nozzle on the back. Pressing that will cause the ice to melt and collect on the bucket which can be cleaned later." This is a relevant answer and so it may be considered.

According to some embodiments of the present disclosure, in yet another example, a query of the customer may be "What would be shipping time for the product?". A response that has been posted in a communication thread of the query of the customer in the online discussion board of the social media may be "3-5 business days".

According to some embodiments of the present disclosure, the tokenizing process may include breaking down the query and the response into words:

query: ["What", "would", "be", "shipping", "time", "for", "the", "product"].
response: ["3-5", "business", "day"].

According to some embodiments of the present disclosure, for example, Bidirectional Encoder Representations from Transformers (BERT) model, may be used to generate word embeddings. Word embeddings are vector representations of a particular word. Word embedding is a representation of document vocabulary, it can capture the context of a word in a document, semantic and syntactic similarity, relation with other words, and the like. The matching keywords can be exact same as in query or response or based on an algorithm it may identify important keywords from a query or response to get a sense of what characterizes a document. Word embeddings are mostly used as input features for other models built for custom tasks.

query embeddings to represent it as a query-vector: [0.2, 0.5, −0.1, 0.3, 0.4, 0.8, 0.1, −0.2].

response embeddings to represent it as a response-vector: [0.1, 0.3, −0.2, 0, 0, 0, 0, 0].

According to some embodiments of the present disclosure, normalization of each vector may include dividing each vector by its magnitude. Assuming L2 i.e., two-dimensional space, normalization of the magnitude may be calculated as follows:

$$\text{Magnitude for the query−vector:}$$
$$\sqrt{\left(0.2^2 + 0.5^2 + -0.1^2 + 0.3^2 + 0.4^2 + 0.8^2 + 0.1^2 + -0.2^2\right)} = \sqrt{1.24}$$

$$\text{Magnitude for the response−vector:}$$
$$\sqrt{\left(0.1^2 + 0.3^2 + -0.2^2\right)} = \sqrt{0.14}$$

According to some embodiments of the present disclosure, $$\text{cosine\_similarity} =$$
$$\frac{\text{Dot Product}}{||\text{Customer Query Vector}|| \cdot ||\text{Customer Service Response Vector}||}$$

$$\text{Dot Product} = \text{Multiple each element of the Question} -$$
$$\text{and} - \text{answer Vectors} = [(0.2 * 0.1) + (0.5 * 0.3) + (-0.1 * -0.2) +$$
$$(0.3 * 0) + (0.4 * 0) + (0.8 * 0) + (0.1 * 0) + (-0.2 * 0)] = 0.19$$
$$\text{Cosine Similarity} = 0.19/(\sqrt{1.24} * \sqrt{0.14}) = 0.457$$

FIG. 5 is a high-level workflow 500 for selecting a valid response, in accordance with some embodiments of the present disclosure.

According to some embodiments of the present disclosure, a system, such as system 100A in FIG. 1A and such as system 100B in FIG. 1B may fetch incremental responses on a customer query 510 by fetching responses that were posted in a communication thread of the query of the customer in the online discussion board of the social media. For example, when a query of a customer has been posted on a digital platform like a forum or social media asking for opinions on the best smartphone. As responses start coming in, the system may gather all the new responses that arrive after your initial query. For example, when five new comments have been received after the question has been posted, the system may capture those five responses.

According to some embodiments of the present disclosure, some of the new responses may be spam, irrelevant, or off-topic. The system, such as system 100A in FIG. 1A and such as system 100B in FIG. 1B may use Natural Language Processing (NLP) tools to analyze each response to filter out responses that don't add value. For instance, if someone replied with "buy cheap sunglasses" instead of discussing smartphones, this response may be identified as irrelevant.

According to some embodiments of the present disclosure, after the filtering of responses by using the NLP tools, to make sure that irrelevant responses weren't filtered as valid then operating validate responses 520 to double-check if the filtered responses are indeed valid or if they should be discarded. For example, if a response contains unrelated content, it would be discarded. However, if it seems genuine but might still be spam, it may be checked to determine if it is spam or irrelevant 530. In case, it is spam or irrelevant, then the response may be discarded 535. when the response is not determined as spam or irrelevant then the Cosine Similarity Score (CSS) may be calculated 540. The checking may be operated based on Bayes' Rule, by finding the probability that a comment or response is spam or irrelevant given that it contains certain words. The probability that each word in the response is irrelevant may be found, and then multiply these probabilities together to get the overall response irrelevance metric to be used in classification, for example as shown in FIG. 4.

According to some embodiments of the present disclosure, the CSS is a mathematical measure used to determine how similar two documents are. In this context, each response may be handled as a document. For example, when two responses discussing different smartphone models may be received. The CSS between each response and the original query may be calculated. If the CSS is greater than 0, which is indicating some level of similarity, it suggests that the response might be relevant to the query of the customer. In this case, the response may be forwarded to a module, such as responder recommended module 140a in FIG. 1A and such as responder recommended module 140b in FIG. 1B, for further analysis or action.

According to some embodiments of the present disclosure, when the CSS is not above zero or a predefine threshold, then, discard the response 555.

According to some embodiments of the present disclosure, when the CSS is not above zero or a predefine threshold, then forward the response and the CSS to next module 560, such as recommendation engine 310 in FIG. 3.

Figure 6:
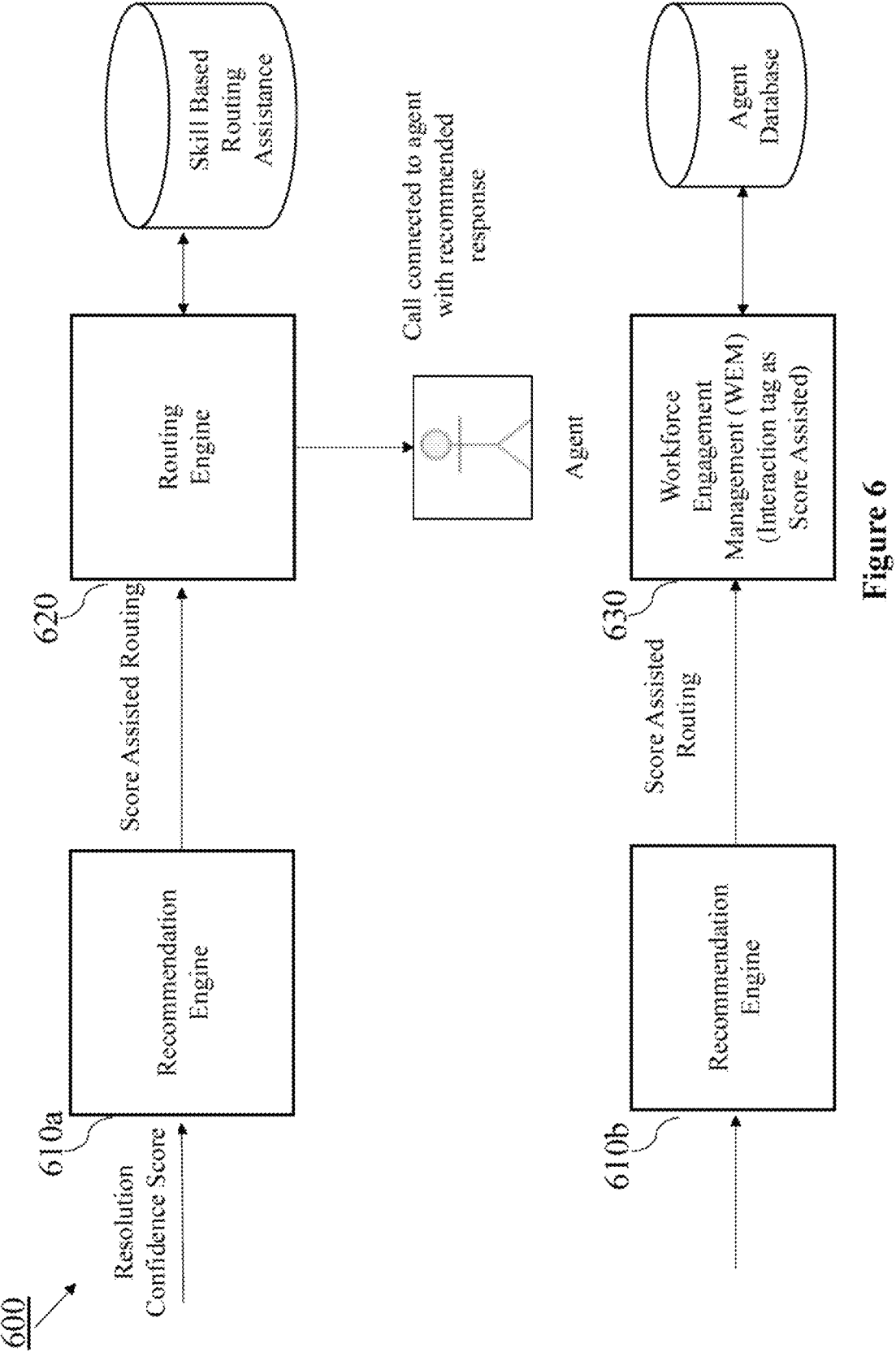
FIG. 6 is a diagram of knowledgebase update, in accordance with some embodiments of the present disclosure.

FIG. 6 is a diagram 600 of knowledgebase update, in accordance with some embodiments of the present disclosure.

According to some embodiments of the present disclosure, the resolution-confidence score may be forwarded to recommendation engine 610a, and 610b, such as recommendation engine 310 in FIG. 3. The resolution-confidence score may be forwarded to the recommendation engine 610a and stored in a database, such as database skill-based routing assistance, when it may be above a preconfigured threshold it may be score assisted routing by routing by a routing engine 620 and displayed to the agent.

According to some embodiments of the present disclosure, the resolution-confidence score may be forwarded to a recommendation engine 610b, which may rout it to a Workforce Engagement Management (WEM) module 630, the query of the customer, e.g., interaction, may be tagged as score assisted and stored in a database, such as agent database. The response may be forwarded to the agent who is getting connected for a response, as shown in FIG. 11. This will ensure agent is in a better state to resolve the interaction, e.g., query, even before the interaction is connected between customer and agent. The interaction may be a score assisted interaction and will result in better contact center KPI's including First Call Resolution, and Reduced Interaction time.

Figure 7:
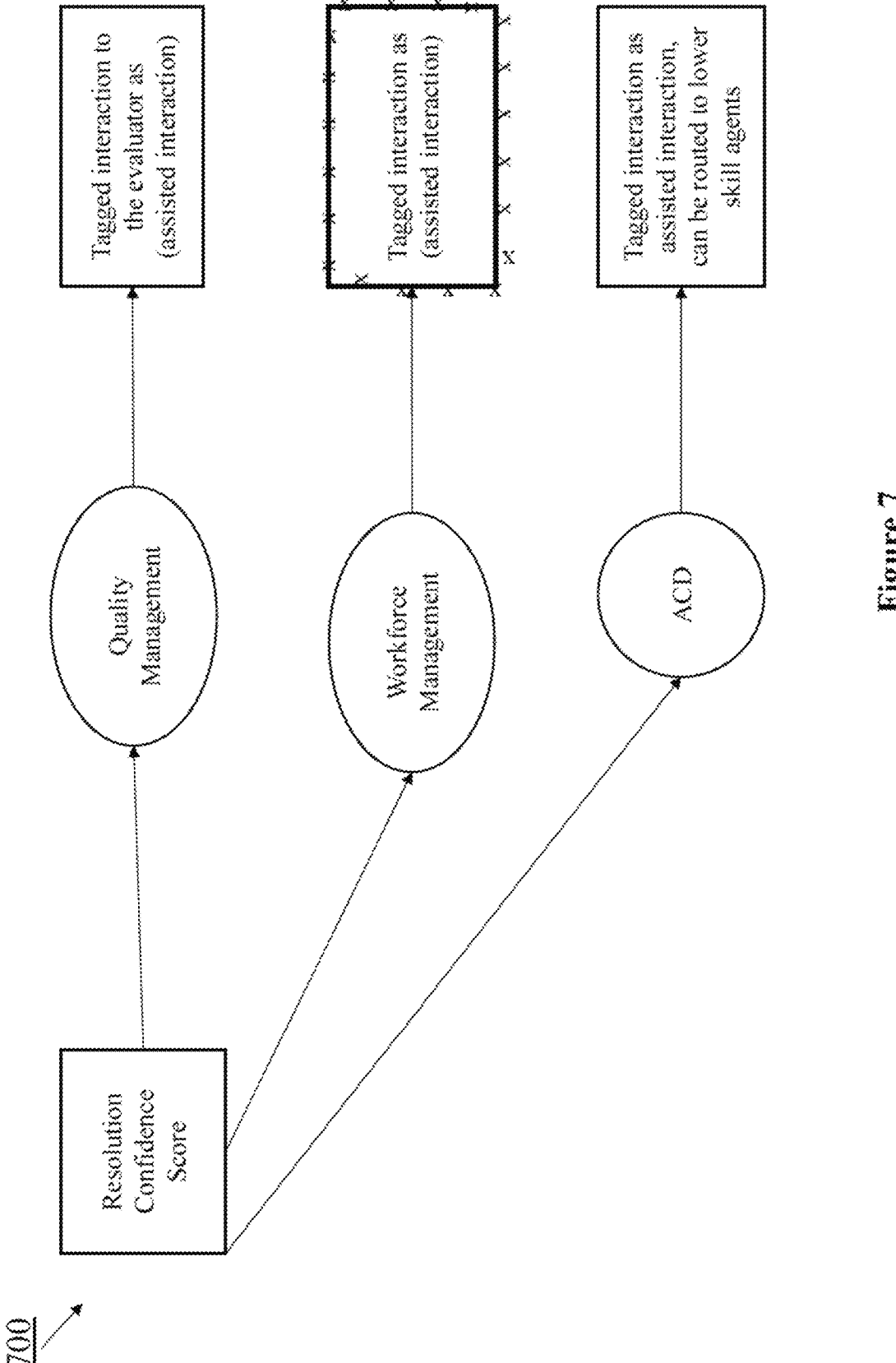
FIG. 7 is a high-level workflow of automated actions, in accordance with some embodiments of the present disclosure.

FIG. 7 is a high-level workflow 700 of automated actions, in accordance with some embodiments of the present disclosure.

According to some embodiments of the present disclosure, interactions that were assisted by responses that were posted in a communication thread of the query of the customer in the online discussion board of the social media, having a resolution-confidence score above a preconfigured threshold may be tagged as "assisted interactions" and may be forwarded to one or more applications, such as Quality Management (QM) application, Workforce Management (WFM) application, and Automatic call Distribution (ACD) application.

According to some embodiments of the present disclosure, the QM application may filter interaction for evaluation based on their tagging as "assisted interaction". Alternatively, an interaction that is tagged as "assisted interaction", will be forwarded to a WFM application which may calculate for each agent the number of interactions which were handled as assisted interactions with a response provided by a system, such as system 100A in FIG. 1A. The ACD application may utilize the assisted interactions tagging of interactions to redirect the interactions to a lower skilled agent.

FIG. 8A is a decision diagram 800A for selecting a valid response, in accordance with some embodiments of the present disclosure.

According to some embodiments of the present disclosure, in a system, such as system 100A in FIG. 1A and such as system 100B in FIG. 1B, a module, such as the responder-recommended module 140a in FIG. 1A may process responses from a module, such as interaction-filtering module 130a in FIG. 1A and generate a resolution-confidence score.

According to some embodiments of the present disclosure, if the resolution-confidence score of a response is above a preconfigured threshold, the response may be sent to a notification module as a recommended solution for the query of the customer. The response may be sent to an agent dashboard where the agent may check the probable solutions recommended from other responders, and same may be update in the knowledgebase for future references.

According to some embodiments of the present disclosure, the resolution-confidence score may be generated using NLP semantic analysis techniques to yield a semantic analysis score, an intent classification score, keyword match related to query and Cosine Similarity Score (CSS). The final score may be the weighted average of above along with the likes, e.g., as shown in FIG. 10D and response comments on the solution proposed.

$$\text{resolution-confidence score} = \text{weighted average } (\textit{No. Of Likes} +$$
$$\textit{No. of Responses}) * \text{Recommendation Score.}$$
$$\text{Recommendation Score} = (\text{Sentiment Score} +$$
$$\text{Intent Score} + \text{Keyword Extract Score} + \text{Cosine Similarity Score}).$$

According to some embodiments of the present disclosure, the sentiment analysis may be operated by NLP techniques such as, part-of-speech tagging, noun phrase extraction, sentiment analysis, and more.

The two measures that are used to analyze the sentiment are:

Polarity which is how positive or negative the opinion is and subjectivity which is how subjective the opinion is.

Figures 8B, 8C:

The sentiment analysis score may be a sum of polarity and subjectivity values as shown in table 800B in FIG. 8B.

According to some embodiments of the present disclosure, the intent score may be calculated having a dialog-flow compare the expression of other responders to the query of the customer to the training phrases for each intent to find the best match. The dialog-flow may use two algorithms to match intents: rule-based grammar matching and Machine Learning (ML) matching. The dialog-flow simultaneously attempts both algorithms and may choose the best result. The dialog-flow may score potential matches with an intent detection confidence score, for example, as shown in table 800C in FIG. 8C.

According to some embodiments of the present disclosure, a system, such as system 100A in FIG. 1A and such as system 100B in FIG. 1B may receive responses form an interaction filtration module 810a. The received responses may be for example, chat messages, emails, or any form of communication. The responses have been filtered out based on NLP tools to analyze the response and filter-out irrelevant responses.

According to some embodiments of the present disclosure, the NLP tolls may rely on messages stored in a database of known queries and determine that a query is valid because it closely matches previous messages in the database.

According to some embodiments of the present disclosure, calculate Solution Confidence Score (SCS) 820a, e.g., resolution-confidence score may be operated for each response that has been determined as valid. This score considers various factors such as CSS (Cosine Similarity Score), sentiment analysis, intent detection, and keywords present in the response. For example, if a customer sends a query expressing frustration about a product feature, the sentiment analysis might assign a negative value, which could lower the resolution-confidence score.

According to some embodiments of the present disclosure, the resolution-confidence score, SCS may be compared to a threshold 830a to check if it meets a predefined threshold. If the SCS is below the threshold, the response is discarded 835a, because it lacks confidence in its accuracy or helpfulness. However, if the SCS is above the threshold, the response is considered reliable and is forwarded for further action.

According to some embodiments of the present disclosure, the resolution-confidence score may be sent to notification module 840a, such as notification module 150b in FIG. 1B, which informs the stakeholder about the solution or response. For example, if a customer asks a question about billing, a system, such as system 100B in FIG. 1B may send the customer a notification with the relevant billing information.

Figure 10E:
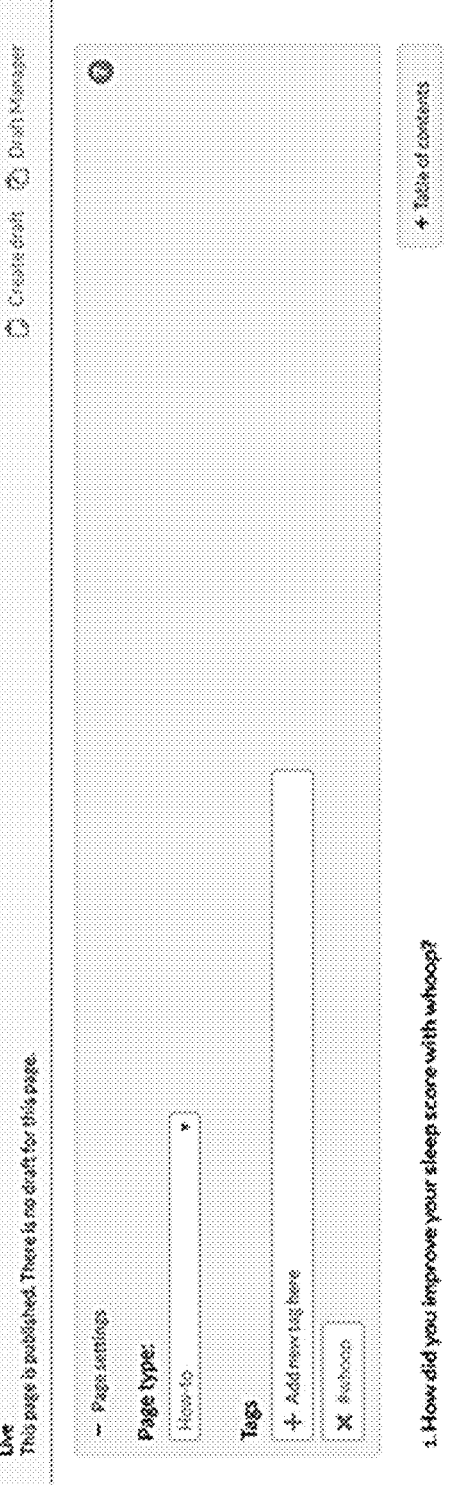

According to some embodiments of the present disclosure, when the resolution-confidence score of the response is above a preconfigured threshold the response may be used to update an expert knowledgebase 850a with the content of the response. Optionally, the response may be reviewed and potentially added or updated in an expert knowledgebase, for example, as shown in FIG. 10E. For example, if the query of the customer hasn't been addressed before, the response with the resolution-confidence score above the preconfigured threshold may be added to the knowledgebase for future reference.

According to some embodiments of the present disclosure, when the resolution-confidence score of the response is above a preconfigured threshold the response may be saved and presented on an agent dashboard 860a, which may allow agents to access the response when assisting customers, providing them with accurate and helpful information. For example, when the query of the customer is how to reset a password, the response may be readily available for agents to refer to with no need to search for it.

Figure 9:
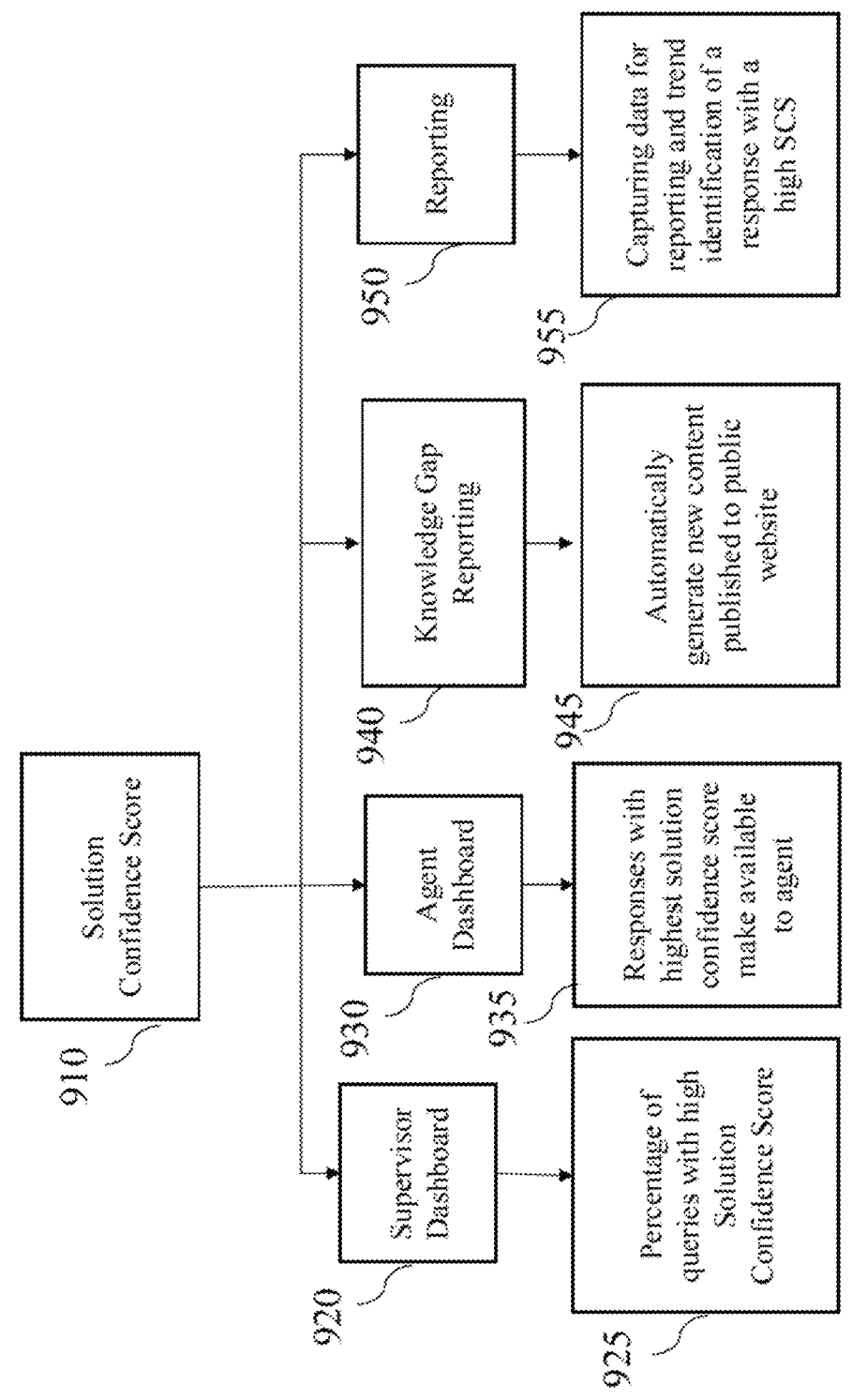
FIG. 9 is a high-level workflow for confidence score usage, in accordance with some embodiments of the present disclosure.

FIG. 9 is a high-level workflow for confidence score usage, in accordance with some embodiments of the present disclosure.

According to some embodiments of the present disclosure, a supervisor dashboard 920 may show to a supervisor that is overseeing a customer service team, for example, based on a resolution-confidence score of a response the percentage of queries that were resolved based on a response having a high resolution-confidence score 925, which is above the preconfigured threshold.

According to some embodiments of the present disclosure, an agent dashboard 930 may provide a quick access to information to handle queries efficiently. Responses with highest solution confidence score make available to agent 935. The highest resolution-confidence score 910 of a response may be used to present responses, such that instead of searching through manuals, the agent may see the response instantly. For example, when an agent gets a call about troubleshooting a router the agent may have a response readily available on the agent dashboard 930, for a faster resolution, thus, improving their average handling time.

According to some embodiments of the present disclosure, knowledge gap reporting 940, such as an expert website may automatically generate new content published to public website 945, for example, as shown in FIG. 10E. Customer interactions may be analyzed to identify areas where there's no existing solution. For example, if customers frequently ask about a new product feature, but there's no documentation, knowledge gap reporting 940 may flag this as a knowledge gap. This may also prompt content creators to generate new articles or Frequently Asked Questions (FAQ) s to address these gaps in the knowledgebase.

According to some embodiments of the present disclosure, reporting 950 may capture data for reporting and trend identification of responses with high SCS, e.g., resolution-confidence score 910 and aggregate data to uncover insights. For example, when reports show a spike in complaints about billing errors, a further analysis may show that many of these issues stem from a particular software glitch, which may be fixed. Reporting not only identifies problems but also helps assess the effectiveness of solutions, ensuring they're credible and addressing the root cause.

FIGS. 10A-10E show an example of a query of a customer and responses that were posted in a communication thread of the query of the customer in the online discussion board of the social media, in accordance with some embodiments of the present disclosure.

According to some embodiments of the present disclosure, UI 1000A is an example of a query of a customer, such as "how did you improve your sleep score?" that has been posted on an online discussion board of a social-media platform, such as Reddit® that may be integrated to a contact center and awaiting in a queue of a digital communication channel of the social-media platform.

According to some embodiments of the present disclosure, responses that were posted in a communication thread of the query of the customer in the online discussion board of the social media, may be filtered by a module, such as interaction-filtering module 130a in FIG. 1A to yield valid responses, as shown in FIG. 10B.

According to some embodiments of the present disclosure, each valid response may be calculated a sentiment score and an intent score, as shown in FIG. 10C.

According to some embodiments of the present disclosure, the cosine similarity score may be measured by TF-IDF. Term Frequency (TF) measures the relative frequency of a term within a document. Inverse Document Frequency (IDF) quantifies the specificity of a term across a collection of documents. The final TF-IDF reflects the importance of a word to a specific document within a larger corpus.

According to some embodiments of the present disclosure, UI 1000E is an example of an updated public website or knowledgebase with valid responses to the query of the customer.

FIG. 11 is an example of a UI 1100 for an agent dashboard with a query of a customer and a response that was posted in a communication thread of the query of the customer in the online discussion board of the social media, in accordance with some embodiments of the present disclosure.

According to some embodiments of the present disclosure, when a query of a customer posted on an online discussion board of a social-media platform integrated to a contact center and awaiting in a queue of a digital communication channel of the social-media platform, an issue gets created and assigned to an agent and waits in a queue. The queue of the digital communication channel may include a plurality of queries that await to the agent who can resolve the queries.

According to some embodiments of the present disclosure, meanwhile before its assigned to the, while the query awaits in the queue, a system, such as system 100A in FIG. 1A and such as system 100B in FIG. 1B may select a response from responses that were that were posted in a communication thread of the query of the customer in the online discussion board of the social media and tagged as valid, that is above a preconfigured threshold and having a highest calculated resolution-confidence score.

According to some embodiments of the present disclosure, when the agent may look at the agent dashboard, such as UI 1100, the agent may see the query of the customer 1105 and a response 1115 with a related resolution-confidence score 1110, as well as other responses with related resolution-confidence score above a preconfigured threshold, which were suggested by other users.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for resolving a query of a customer posted on an online discussion board of a social-media platform integrated to a contact center and awaiting in a queue of a digital communication channel of the social-media platform, said computerized-method comprising:

(i) monitoring, by one or more processors, the digital communication channel queue to select the query of the customer, wherein the queue of the digital communication channel comprising a plurality of queries that await an available agent who can resolve the queries;

(ii) operating, by the one or more processors, an interaction-filtering module against the query of the customer to tag one or more responses that were posted in a communication thread of the query of the customer in the online discussion board of the social media, as valid;

(iii) calculating a resolution-confidence score for each response of the one or more responses that were tagged as valid, by operating by the one or more processors a responder-recommended module;

(iv) selecting a response from the one or more responses that were tagged as valid that is above a preconfigured threshold and having a highest calculated resolution-confidence score;

(v) automatically sending by the one or more processors the selected response to the customer as a tryout-solution to the query via the digital communication channel of the social-media platform; and (vi) upon receiving an indication from the customer via the digital communication channel of the social-media platform, that the query of the customer is resolved, removing the query of the customer from the queue of the digital communication channel of the social-media platform, such that the available agent is not assigned the query of the customer, for each response of the one or more responses that were tagged as valid:

(vii) calculating a Cosine Similarity Score (CSS);

(viii) calculating a recommendation score according to formula I:

$$\text{recommendation score} = (\text{sentiment score} + \qquad \text{(I)}$$
$$\text{intent classification score} + \text{keyword extract score} + CSS),$$

whereby:

the sentiment score is a sum of polarity value and subjectivity value of the response, the intent classification score is an indication of intent of a responder of the response to resolve the query of the customer, the keyword extract score is a number of matching keywords in the response and the query of the customer, and the CSS is a measurement of similarity between the response and the query of the customer, (ix) calculating the resolution-confidence score according to formula II:

$$\text{resolution–confidence score} = \text{weighted average (number of likes} + \qquad \text{(II)}$$
$$\text{number of responses)} * \text{recommendation score,}$$

whereby:

the number of likes is a count of users who have liked the response that was posted in a communication thread of the query of the customer in the online discussion board of the social media, the number of responses is a number of responses that were posted in a communication thread of the query of the customer in the online discussion board of the social media, and the recommendation score is the calculated recommendation score.

2. The computerized-method of claim 1, wherein the interaction-filtering module comprising:

(i) retrieving one or more responses that were posted in a communication thread of the query of the customer in the online discussion board of the social media;

(ii) validating each response in the retrieved one or more responses by using a Natural Language Processing (NLP) tool to analyze the response and filter-out irrelevant responses, wherein irrelevant responses are responses that their analysis indicates that they don't match the query; and (iii) tagging as valid the validated responses that were not filtered-out.

3. The computerized-method of claim 1, wherein the CSS is calculated by:

(i) tokenizing the query of the customer into words;

(ii) generating a word embedding of the tokenized query of the customer to represent it as a query-vector, wherein the query-vector has one or more query-entries, (iii) normalizing the query-vector by dividing each entry in the query-vector by its magnitude to create a unit query-vector;

(iv) tokenizing the response into words;

(v) generating word embedding of the response to represent is as a response-vector, wherein the response-vector has one or more response-entries, (vi) normalizing the response-vector by dividing each entry in the response-vector by its magnitude to create a unit response-vector; and (vii) calculating the CSS according to formula III:

$$CSS = \text{Dot Product}/\|\text{customer query vector}\| * \|\text{response vector,}\| \qquad \text{(III)}$$

whereby:

the Dot Product is a sum of each query-entry in the unit query-vector multiplied by corresponding response-entry in the unit response-vector, the customer query vector is the unit query-vector, and the response vector is the unit response-vector.

4. The computerized-method of claim 1, wherein when no indication has been received from the customer via the digital communication channel that the query is resolved, the computerized-method further comprising displaying the tagged one or more responses sorted in descending manner by the calculated resolution-confidence score to an agent via a display unit, when the query is assigned to the agent.

5. The computerized-method of claim 1, wherein the computerized-method further comprising, after sending the selected response to the customer as a tryout-solution to the query via the digital communication channel and receiving an indication from the customer that the response didn't resolve the query, repeatedly selecting a response having next highest calculated resolution-confidence score to the customer as the tryout-solution until receiving an indication from the customer via the digital communication channel that the query is resolved or all the tagged one or more responses have been sent to the customer.

6. The computerized-method of claim 1, wherein the computerized-method further comprising:

(i) discarding responses having the resolution-confidence score below the preconfigured threshold;

(ii) storing responses having the resolution-confidence score above the preconfigured threshold with the query of the customer, in a knowledgebase database; and (iii) retrieving the responses to the query of the customer and presenting them via an agent dashboard when a different customer is posting a new query that is similar to the query of the customer.

7. A computerized-system for resolving a query of a customer posted on an online discussion board of a social-media platform integrated to the contact center and awaiting in a queue of a digital communication channel of the social-media platform, said computerized-system comprising:

one or more processors, said one or more processors are configured to:

(i) monitor the digital communication channel queue to select the query of the customer, wherein the queue of the digital communication channel comprising a plurality of queries that await an available agent who can resolve the queries, (ii) operate interaction-filtering module against the query of the customer to tag one or more responses that were posted in a communication thread of the query of the customer in the online discussion board of the social media, as valid;

(iii) calculate a resolution-confidence score for each response of the one or more responses that were tagged as valid, by operating a responder-recommended module;

(iv) select a response from the one or more responses that were tagged as valid that is above a preconfigured threshold and having a highest calculated resolution-confidence score;

(v) automatically send the selected response to the customer as a tryout-solution to the query via the digital communication channel of the social-media platform; and (vi) upon receiving an indication from the customer via the digital communication channel of the social-media platform, that the query of the customer is resolved, remove the query of the customer from the queue of the digital communication channel of the social-media platform such that the available agent is not assigned the query of the customer, for each response of the one or more responses that were tagged as valid:

(vii) calculating a Cosine Similarity Score (CSS);

(viii) calculating a recommendation score according to formula I:

$$\text{recommendation score} = (\text{sentiment score} + \text{intent classification score} + \text{keyword extract score} + \text{CSS}), \quad (I)$$

whereby:

the sentiment score is a sum of polarity value and subjectivity value of the response, the intent classification score is an indication of intent of a responder of the response to resolve the query of the customer, the keyword extract score is a number of matching keywords in the response and the query of the customer, and the CSS is a measurement of similarity between the response and the query of the customer, (ix) calculating the resolution-confidence score according to formula II:

$$\text{resolution-confidence score} = \text{weighted average}(\text{number of likes} + \text{number of responses}) * \text{recommendation score}, \quad (II)$$

whereby:

the number of likes is a count of users who have liked the response that was posted in a communication thread of the query of the customer in the online discussion board of the social media, the number of responses is a number of responses that were posted in a communication thread of the query of the customer in the online discussion board of the social media, and the recommendation score is the calculated recommendation score.

* * * * *